United States Patent
Schad et al.

(12) 
(10) Patent No.: US 11,167,460 B2
(45) Date of Patent: Nov. 9, 2021

(54) INJECTION MOLDING MACHINE WITH ROTARY APPARATUS

(71) Applicant: Niigon Machines Ltd., Vaughan (CA)

(72) Inventors: Robert D. Schad, Toronto (CA); Carsten Link, Burlington (CA); Hemant Kumar, Brampton (CA)

(73) Assignee: NIIGON MACHINES LTD., Vaughan (CA)

( * ) Notice: Subject to any disclaimer, the term of this patent is extended or adjusted under 35 U.S.C. 154(b) by 349 days.

(21) Appl. No.: 16/212,823

(22) Filed: Dec. 7, 2018

(65) Prior Publication Data

US 2019/0118436 A1    Apr. 25, 2019

Related U.S. Application Data

(63) Continuation of application No. PCT/CA2017/050702, filed on Jun. 8, 2017.
(Continued)

(51) Int. Cl.
*B29C 45/04* (2006.01)

(52) U.S. Cl.
CPC .................. *B29C 45/045* (2013.01)

(58) Field of Classification Search
CPC . B29C 45/045; B29C 45/1761; B29C 45/062; B29C 2045/1637; B29C 2045/06
(Continued)

(56) References Cited

U.S. PATENT DOCUMENTS 3,838,961 A    10/1974    Yogosawa et al.
4,330,257 A    5/1982    Rees et al.
(Continued)

FOREIGN PATENT DOCUMENTS

CA    2567134 C    3/2010
CN    202021752 U    11/2011
(Continued)

OTHER PUBLICATIONS

International Search Report and Written Opinion of corresponding International Application No. PCT/CA2015/050406 dated Sep. 7, 2017.

*Primary Examiner* — Marc C Howell
*Assistant Examiner* — Nicholas J Chidiac
(74) *Attorney, Agent, or Firm* — Bereskin & Parr LLP/S.E.N.C.R.L., S.R.L.

(57) ABSTRACT

An injection molding machine includes a stationary platen and a moving platen mounted on a machine base, and a rotary apparatus for rotatably supporting a center mold section. The rotary apparatus includes a carriage body including a carriage upper portion supported by first and second carriage rails, and a carriage lower portion extending downward from the carriage upper portion laterally intermediate the first and second carriage rails. The rotary apparatus further includes a rotary table mounted atop the carriage body for rotatably supporting the center mold section. The rotary table is mounted to the carriage body by a rotary table bearing having a combination of bearing elements to bear axial, rotational, and moment loads. The machine further includes a plurality of tie bars extending between the moving platen and the stationary platen. The tie bars are free from engagement by the rotary apparatus.

30 Claims, 24 Drawing Sheets

Related U.S. Application Data

(60) Provisional application No. 62/409,128, filed on Oct. 17, 2016, provisional application No. 62/347,580, filed on Jun. 8, 2016.

(58) Field of Classification Search
USPC .................................................. 425/576
See application file for complete search history.

(56) References Cited

U.S. PATENT DOCUMENTS

| | | | |
|---|---|---|---|
| 4,786,455 A | 11/1988 | Krishnakumar et al. | |
| 5,773,049 A | 6/1998 | Kashiwa et al. | |
| 6,558,149 B1 | 5/2003 | Bodmer et al. | |
| 6,709,251 B2 | 3/2004 | Payette et al. | |
| 6,994,810 B2 | 2/2006 | Hahn et al. | |
| 7,018,189 B2 | 3/2006 | Wobbe et al. | |
| 7,232,538 B2 | 6/2007 | Mai | |
| 7,306,445 B2 | 12/2007 | Wobbe et al. | |
| 7,455,516 B2 | 11/2008 | Bernd et al. | |
| 7,484,948 B2 | 2/2009 | Wimberger | |
| 7,695,266 B2 | 4/2010 | MacDonald et al. | |
| 7,699,599 B2 | 4/2010 | Laurent et al. | |
| 7,922,477 B2 | 4/2011 | Danel | |
| 8,163,218 B2 * | 4/2012 | Kato | B29C 45/68 264/255 |
| 8,764,434 B2 | 7/2014 | Armbruster | |
| 9,168,687 B2 | 10/2015 | Armbruster | |
| 2003/0077354 A1 | 4/2003 | Wohlrab | |
| 2009/0304841 A1 | 12/2009 | Eigler et al. | |
| 2010/0244314 A1 * | 9/2010 | Kato | B29C 45/1628 264/255 |
| 2012/0052144 A1 | 3/2012 | Schad et al. | |

FOREIGN PATENT DOCUMENTS

| | | |
|---|---|---|
| CN | 202137927 U | 2/2012 |
| DE | 20022466 U1 | 9/2001 |
| DE | 102008050994 A1 | 4/2009 |
| EP | 2726267 B1 | 5/2017 |
| FR | 2372019 A1 | 6/1978 |
| JP | S6260618 A | 3/1987 |
| JP | H06344372 A | 12/1994 |
| JP | 2011140191 A | 7/2011 |
| WO | 2005035218 A1 | 4/2005 |
| WO | 2006106036 A1 | 10/2006 |
| WO | 2009143600 A1 | 12/2009 |

\* cited by examiner

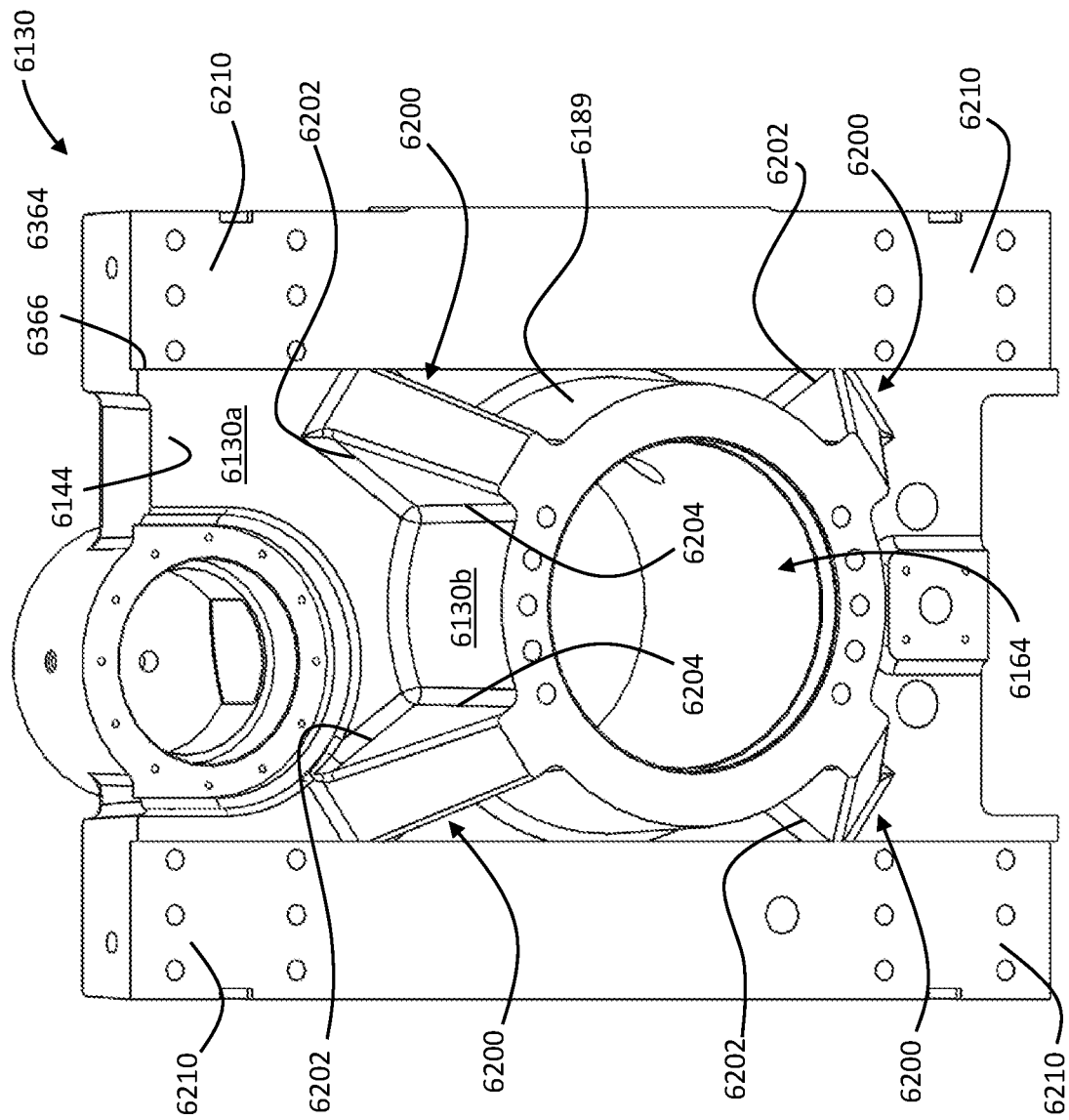

INJECTION MOLDING MACHINE WITH ROTARY APPARATUS

This application is a continuation of PCT Application Serial No. PCT/CA2017/050702, filed Jun. 8, 2017, which claims the benefit of Provisional Application Ser. No. 62/409,128, filed Oct. 17, 2016, and Provisional Application Ser. No. 62/347,580, filed Jun. 8, 2016, each of which is hereby incorporated herein by reference.

FIELD

The specification relates to injection molding machines, elements thereof, and methods and apparatuses for supporting and using center mold assemblies in an injection molding machine.

BACKGROUND

U.S. Pat. No. 7,455,516 discloses a horizontal injection molding machine that includes two platens, of which one can be a fixed or a moving platen and the other a moving platen, with the platens moving on horizontal columns, and a mold half carrier which is rotatably supported by a turntable and carries mold halves for injection molding tools. A yoke extends between the upper columns for movement along the upper columns. The mold half carrier has on its top side a pivot pin which engages in an opening of the yoke. This arrangement is thought to eliminate or at least reduce forces on the columns due to weight and torques.

U.S. Pat. No. 7,699,599 discloses a carousel-type rotating machine that includes a rotating frame bearing several work stations, and a power and fluid supply rotating column which is coaxial to the axis of the rotating frame and incorporates a rotatable electric collector connected to a fixed power source for supplying power to the work stations and a rotatable fluid connection connected to a fixed fluid source for supplying fluid to the work stations. The rotatable fluid connection is disposed on the top of the rotating column above the rotatable electric collector, thereby having the reduced diameter of the part thereof rotatable at reduced linear speeds between the fixed and rotatable parts thereof.

U.S. Pat. No. 8,163,218 discloses an injection molding machine for two-material molding including two sets of injection units that plasticize different resin materials and injection-fill the materials. A mold clamping unit is a hydraulic mold clamping unit that mold-clamps three sets of die plates simultaneously. A movable die plate opening and closing unit is a movable die plate opening and closing unit driven by an electric motor. A rotational die plate opening and closing unit is a rotational die plate opening and closing unit driven by an electric motor. A rotating unit for the rotational die plate is a rotation driving unit driven by an electric motor attached to a reversal pedestal.

U.S. Pat. No. 9,168,687 discloses a rotation device for rotating the center part in an injection-molding device. The rotation device comprises a column which is non-rotatably mounted in the interior of the center part and a sleeve surrounding the same which is mounted such as to rotate with the center part, said sleeve and said column being operatively interconnected via a drive.

SUMMARY

The following summary is intended to introduce the reader to various aspects of the applicant's teaching, but not to define any invention.

According to some examples, an injection molding machine includes a stationary platen and a moving platen mounted on a machine base. The stationary platen supports a stationary mold portion and the moving platen supports a moving mold portion. The moving platen is translatable toward and away from the stationary platen along a pair of platen rails oriented parallel to a machine axis. The machine further includes a rotary apparatus for rotatably supporting a center mold section. The rotary apparatus is translatable along the machine axis between the stationary and moving platens. The rotary apparatus includes a carriage body. The carriage body includes a carriage upper portion having an underside surface supported by first and second carriage rails extending parallel to the machine axis and spaced laterally inwardly of the platen rails. The carriage body includes a carriage lower portion extending downward from the carriage upper portion and laterally intermediate the first and second carriage rails. The rotary apparatus further includes a rotary table mounted atop the carriage body and rotatable relative to the carriage body about a vertical table axis for rotatably supporting the center mold section. The rotary table is mounted to the carriage body by a rotary table bearing having a combination of bearing elements to bear axial, rotational, and moment loads. The bearing elements are contained between a first race fixed in abutting relation to a bottom surface of the rotary table and a second race fixed in abutting relation to an opposed upper surface of the carriage upper portion. The machine further includes a plurality of tie bars extending between the moving platen and the stationary platen for exerting a clamp force across the respective mold portions. The tie bars are free from engagement by the rotary apparatus.

In some examples, the first and second carriage rails are mounted to first and second carriage beams, respectively. The first and second carriage beams extend parallel to the machine axis and are spaced laterally apart from each other. The carriage lower portion extends downward between the carriage beams.

In some examples, the first and second carriage rails are spaced laterally apart from each other by a carriage rail spacing. The table has a table lateral extent when the machine is in a mold-closed condition. The table lateral extent is greater than the carriage rail spacing.

In some examples, the carriage rails are generally tangential to the rotary table bearing when viewed along the table axis.

In some examples, the carriage body further includes an actuator connection portion extending downward from the carriage lower portion for attachment to an actuator for urging translation of the rotary apparatus. The actuator connection portion is disposed below a lowermost extent of the carriage beams.

In some examples, the carriage body further includes a central bore for receiving a rotary union. The central bore has a bore upper end proximate the rotary table and a bore lower end adjacent a lowermost extent of the carriage lower portion. The actuator connection portion extends radially across the bore lower end.

In some examples, the actuator connection portion includes a load transfer portion for engagement with the carriage lower portion and a coupling portion extending downward from the load transfer portion for coupling with the actuator. The load transfer portion is for transferring a horizontal force from the coupling portion to the carriage body.

In some examples, the load transfer portion of the actuator connection portion is generally v-shaped in cross-section, and includes arms extending upwardly and outwardly from the coupling portion to the carriage lower portion.

In some examples, the coupling portion includes a cylindrical boss coaxial with the table axis for pivotable connection to an actuator.

In some examples, the carriage upper portion and the carriage lower portion are of integral, unitary construction with the carriage body.

In some examples, the carriage lower portion has an outer surface generally of inverted frusto-conical shape.

In some examples, the carriage lower portion further includes a plurality of gussets each oriented in a generally vertical plane and having a laterally extending upper edge fixed to the underside surface of the carriage upper portion and a vertically extending inner side edge fixed to the outer surface of the carriage lower portion.

In some examples, the gussets are aligned, when viewed from above, along lines extending generally from the table axis to load bearing contact points of the carriage body when mounted to the base.

According to some aspects, an injection molding machine includes a machine base; a stationary platen mounted to the machine base for supporting a stationary mold portion; and a moving platen for supporting a moving mold portion and translatable along a first platen rail and a second platen rail. The first and second platen rails are parallel to each other and to a machine axis. The machine further includes a rotary apparatus for rotatably supporting a center mold assembly. The rotary apparatus is translatable along the machine axis between the stationary and moving platens. The rotary apparatus includes a carriage body. The carriage body includes a carriage upper portion having an underside surface supported by first and second carriage rails mounted to respective carriage beams and oriented parallel to the machine axis and spaced laterally apart from each other by a carriage rail spacing; a carriage lower portion extending downward from the carriage upper portion and laterally intermediate the first and second carriage rails; and an actuator connection portion extending downward from the carriage lower portion for attachment to an actuator for urging translation of the rotary apparatus. The actuator connection portion is disposed below a lowermost extent of the carriage beams. The rotary apparatus further includes a rotary table mounted atop the carriage body and rotatable relative to the carriage body about a vertical table axis for rotatably supporting the center mold assembly; and a rotary union housed in the carriage body beneath the rotary table and above the actuator connection portion, the rotary union fixed to rotate with the table about the table axis.

In some examples, the carriage body further includes a central bore for receiving the rotary union. The central bore has a central bore upper end open to a top surface of the carriage upper portion and a central bore lower end generally closed off by the actuator connection portion.

In some examples, the rotary union has an upper surface with union conduit upper ends in sealed engagement with lower ends of block conduits in an underside surface of a center support block of the center mold assembly when mounted on the table.

In some examples, the central bore includes an inner sidewall with a plurality of annular grooves, each groove in fluid communication with an inner end of a respective carriage body conduit, each carriage body conduit having an outer end open to an outer surface of the carriage for connection to a fluid supply conduit.

In some examples, the rotary union includes a generally cylindrical body with a plurality of internal union conduits, each union conduit extending between a respective one of the union conduit upper ends and a union conduit lower end in fluid communication with one of the annular grooves of the inner sidewall of the central bore.

In some examples, the central bore includes a sleeve of corrosion-resistant material fixed in the carriage body. In some examples, the inner sidewall includes the sleeve.

In some examples, the machine further includes a drain conduit extending through the actuator connection portion. The drain conduit extends from a drain inlet disposed in an upper surface of the actuator connection portion beneath the rotary union, and a drain outlet open to an exterior surface of the actuator connection portion and disposed at an elevation below the drain inlet.

According to some aspects, an injection molding machine includes a machine base; a stationary platen mounted to the machine base for supporting a stationary mold portion; a moving platen translatable along the base for supporting a moving mold portion; and a plurality of tie bars extending between the stationary and moving platens. The plurality of tie bars include a pair of lower tie bars and a pair of upper tie bars. The machine further includes a carriage body translatable between the stationary and moving platens along the base; and a rotary table rotatably mounted atop the carriage body and rotatable relative to the carriage body about a vertical table axis. The table supports a center mold assembly. The machine further includes a rotary union housed in the carriage body and fixed to rotate with the table about the table axis; and at least one liquid service connection port fixed to the carriage body for connection to a liquid service supply conduit. The at least one liquid service connection port is in fluid communication with the rotary union for providing a respective liquid service from the liquid service supply conduit to the center mold assembly. The machine further includes a services distribution assembly disposed above the center mold assembly for providing electrical service to the center mold assembly from at least one upstream electrical supply conductor that is generally stationary relative to the machine base.

In some examples, all liquid service required by the center mold assembly is provided via the rotary union.

In some examples, the machine is free of connection with liquid supply conduits above the center mold assembly.

In some examples, the liquid service connection port is at an elevation generally below an elevation of the table.

In some examples, the services distribution assembly includes a manifold fixed to an upper surface of the center mold support block and in fluid communication with the rotary union, and at least one valve fixed to the manifold for controlling flow through the manifold.

In some examples, the services distribution assembly further includes a rotary electrical connector having an electrical rotor member fixed to rotate with the center mold support block and an electrical stator member adjacent the rotor member and fixed to an anti-rotate stay. The stator member is translatable with the carriage body and free of attachment to the tie bars. The rotor member is rotatably coupled to the stator member. The electrical connector provides electrical communication between the upstream electrical supply conductor and a downstream conductor connected to the valve.

In some examples, the anti-rotate stay includes an upper shaft coaxial with the table axis and disposed vertically above the upper end of the block, the upper shaft maintaining a generally fixed rotational position relative to the carriage body.

In some examples, the upper shaft includes an upper portion of a central rod that extends vertically through the block. The rod has a rod lower end fixed to the carriage body and the block rotatable about the rod.

In some examples, the machine further includes a horizontally oriented lock screw in engagement with a flat provided on rod lower end.

In some examples, the upper shaft includes a driveshaft coupled to a motor. Rotation of the driveshaft is controllable by the motor to be generally equal in velocity and extent but opposite in direction in relation to rotation of the rotary table.

In some examples, the anti-rotate stay includes an overhanging end of a support arm. The support arm is slidably mounted to the stationary platen.

In some examples, the machine further includes a mounting plate secured to the stationary platen and a horizontal rail fixed to the mounting plate. The support arm is slidably coupled to the horizontal rail.

Other aspects and features of the present specification will become apparent, to those ordinarily skilled in the art, upon review of the following description of the specific examples of the specification.

BRIEF DESCRIPTION OF THE DRAWINGS

The drawings included herewith are for illustrating various examples of articles, methods, and apparatuses of the present specification and are not intended to limit the scope of what is taught in any way. In the drawings:

FIG. 10b is an enlarged view of a portion of FIG. 10a;

FIG. 23 is an enlarged bottom perspective view of a carriage body portion of the machine of FIG. 21.

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or processes described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

Figure 1:
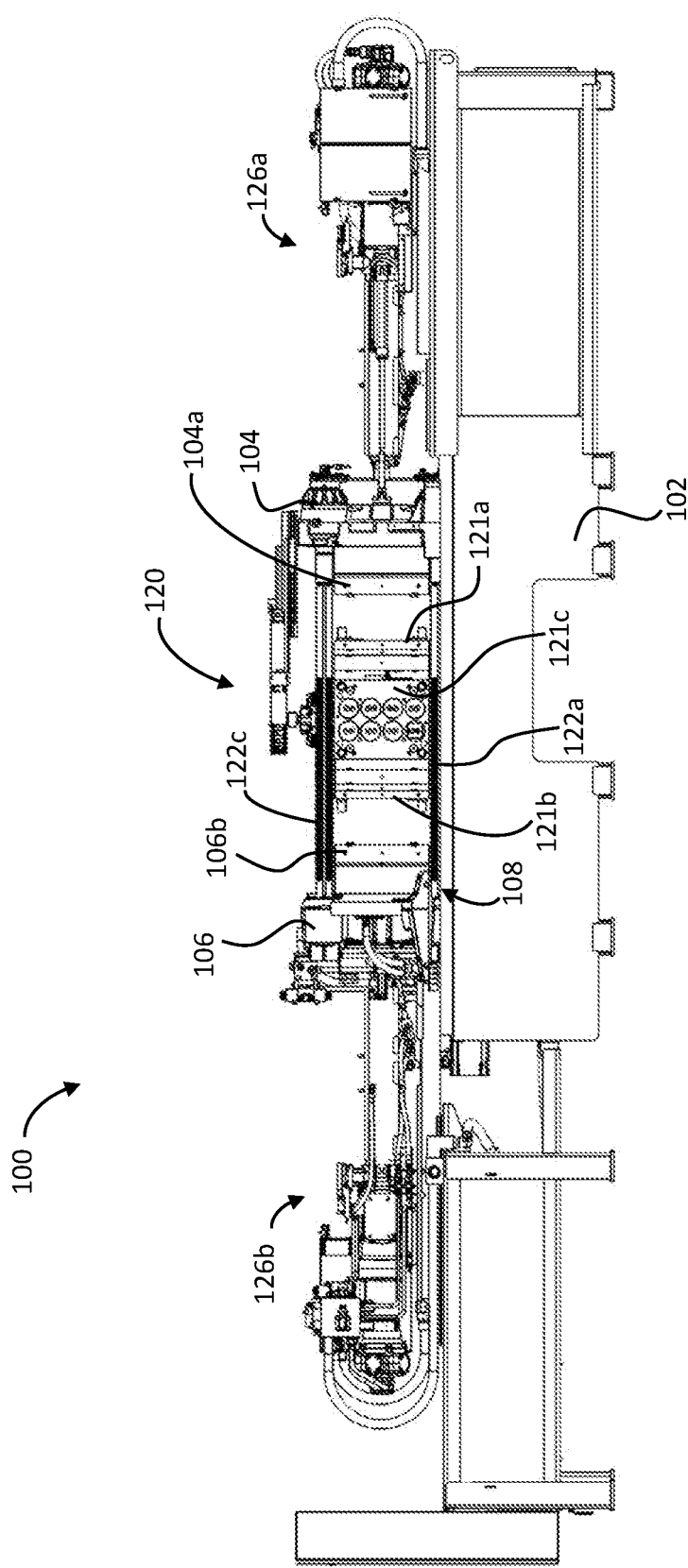
FIG. 1 is an elevation view of an injection molding machine.

Referring to FIG. 1, an injection molding machine 100 includes a machine base 102, a stationary platen 104 fixed to the machine base 102 for supporting a stationary mold section 104a, and a moving platen 106 for supporting a moving mold section 106a. The moving platen is translatable along a platen slide surface 108, which in the example illustrated, includes a first platen rail 110a and a second platen rail 110b (see also FIG. 4). The first and second platen rails 110a, 110b are parallel to each other and to a machine axis 112. The first and second platen rails 110a, 110b are fixed to the base 102 and spaced laterally apart from each other by a platen rail spacing 114.

Figure 2:
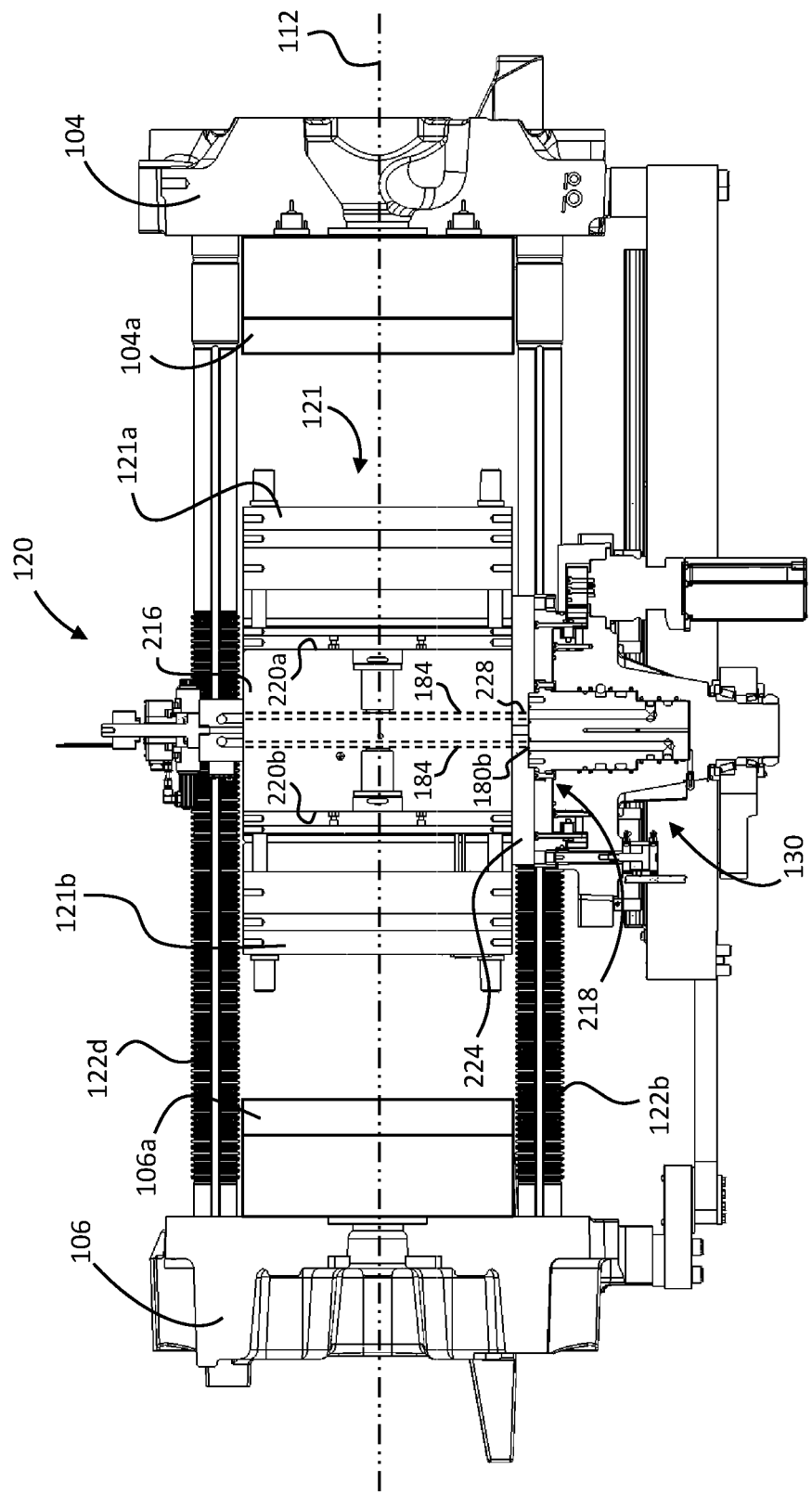
FIG. 2 is an enlarged view of a portion of the machine of FIG. 1.

With reference also to FIG. 2, the machine 100 further includes a rotary apparatus 120 for rotatably supporting a center mold assembly 121. The rotary apparatus 120 is translatable relative to the base 102 along the machine axis 112 and is disposed axially intermediate the stationary and moving platens 104, 106.

Figure 5:
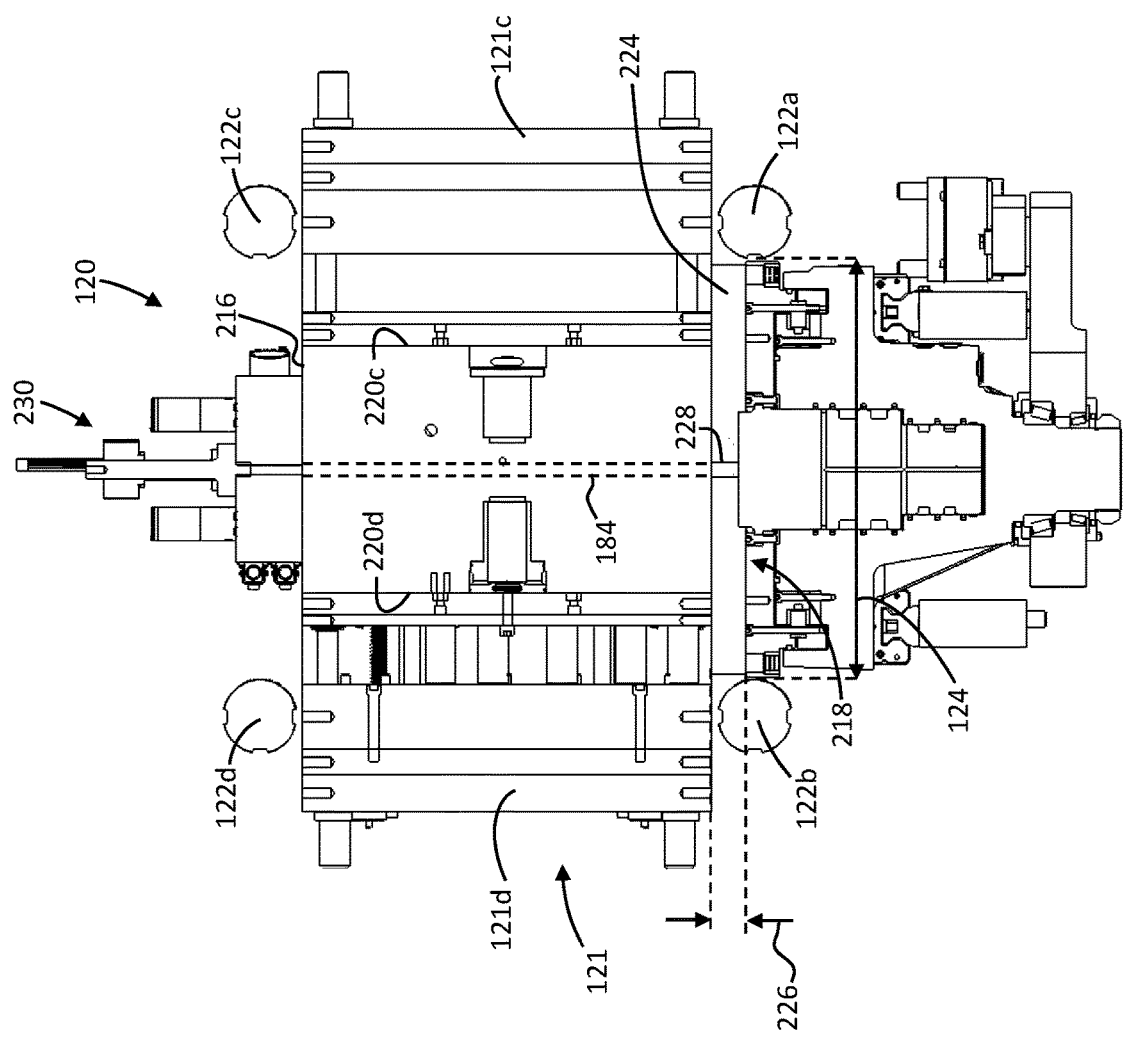
FIG. 5 is a cross-sectional end view of a portion of the structure of FIG. 2.

In the example illustrated, and with reference also to FIG. 5, the machine 100 includes a plurality of tie bars 122 that extend between the platens 104, 106 and to which the moving platen 106 can be releasably locked for exerting a clamping force across the mold sections when the machine is in a mold-closed condition. In the example illustrated, the machine 100 includes two lower tie bars 122a, 122b (also referred to as "first lower tie bar 122a" and "second lower tie bar 122b") and two upper tie bars 122c, 122d (also referred to as "first upper tie bar 122c" and "second upper tie bar 122d"). The first and second lower tie bars 122a, 122b are spaced laterally apart from each other by a tie bar spacing 124.

Referring to FIG. 1, the machine 100 includes at least one injection unit for injecting resin into cavities of the mold sections. In the example illustrated, the machine 100 includes a first injection unit 126*a* aligned parallel to the machine axis 112 and axially outboard of the stationary platen 104, and a second injection unit 126*b* aligned parallel to the machine axis 112 and disposed axially outboard of the moving platen 106. The second injection unit 126*b* is, in the example illustrated, coupled to and translates with the moving platen 106.

Figure 3:
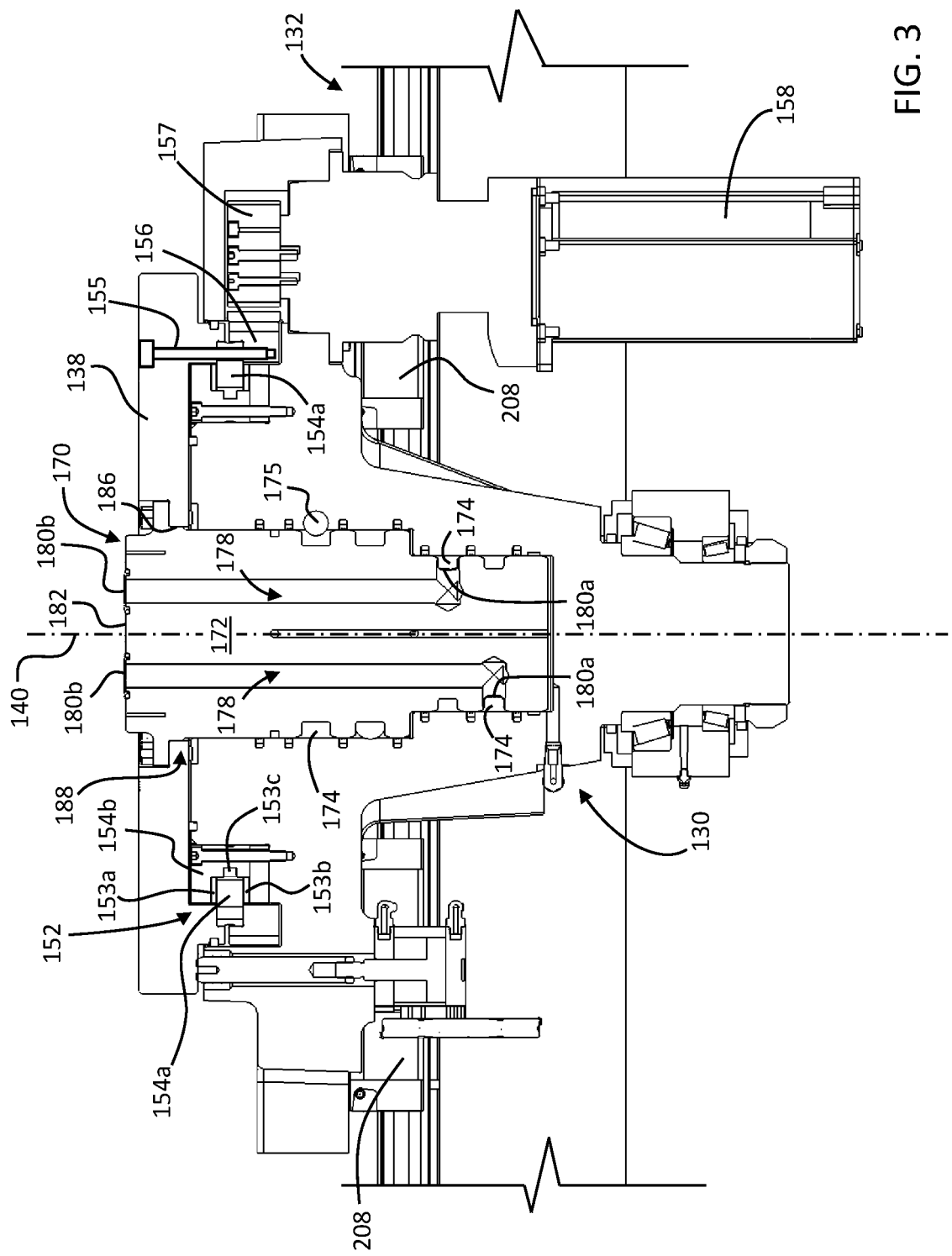
FIG. 3 is an enlarged cross-sectional side view of a portion of the structure of FIG. 2.
Figure 4:
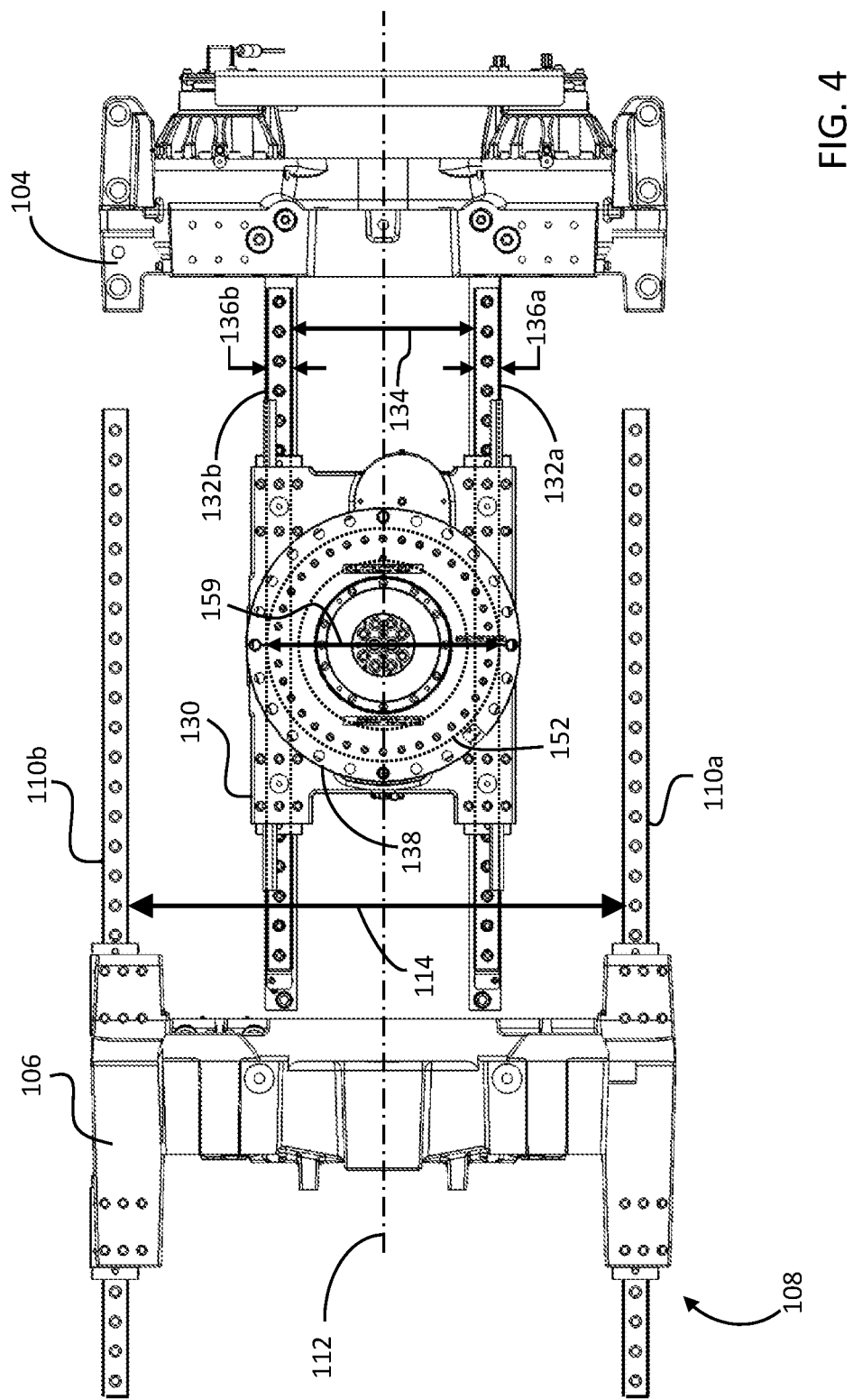
FIG. 4 is a top view of the structure of FIG. 2 with some elements removed.

Referring now also to FIGS. 3 and 4, in the example illustrated, the rotary apparatus 120 includes a carriage body 130 slidably supported on a carriage slide surface 132. The carriage slide surface 132 includes, in the example illustrated, first and second carriage rails 132*a*, 132*b* extending parallel to the machine axis 112 and spaced laterally apart from each other by a carriage rail spacing 134. The carriage rail spacing 134 is less than the platen rail spacing 114 in the example illustrated.

Figure 6:
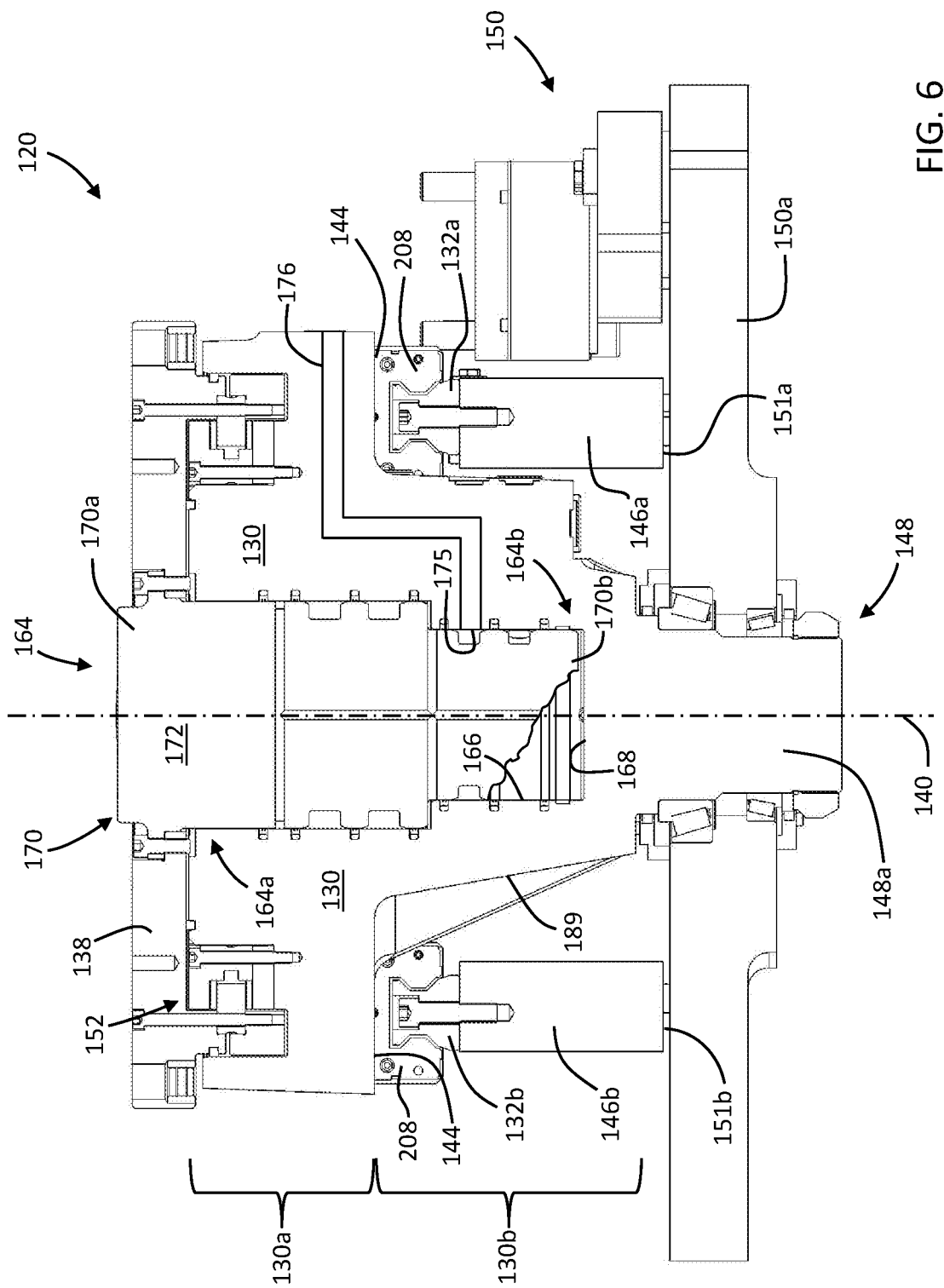
FIG. 6 is an enlarged view of a portion of the structure of FIG. 5.
Figure 7:
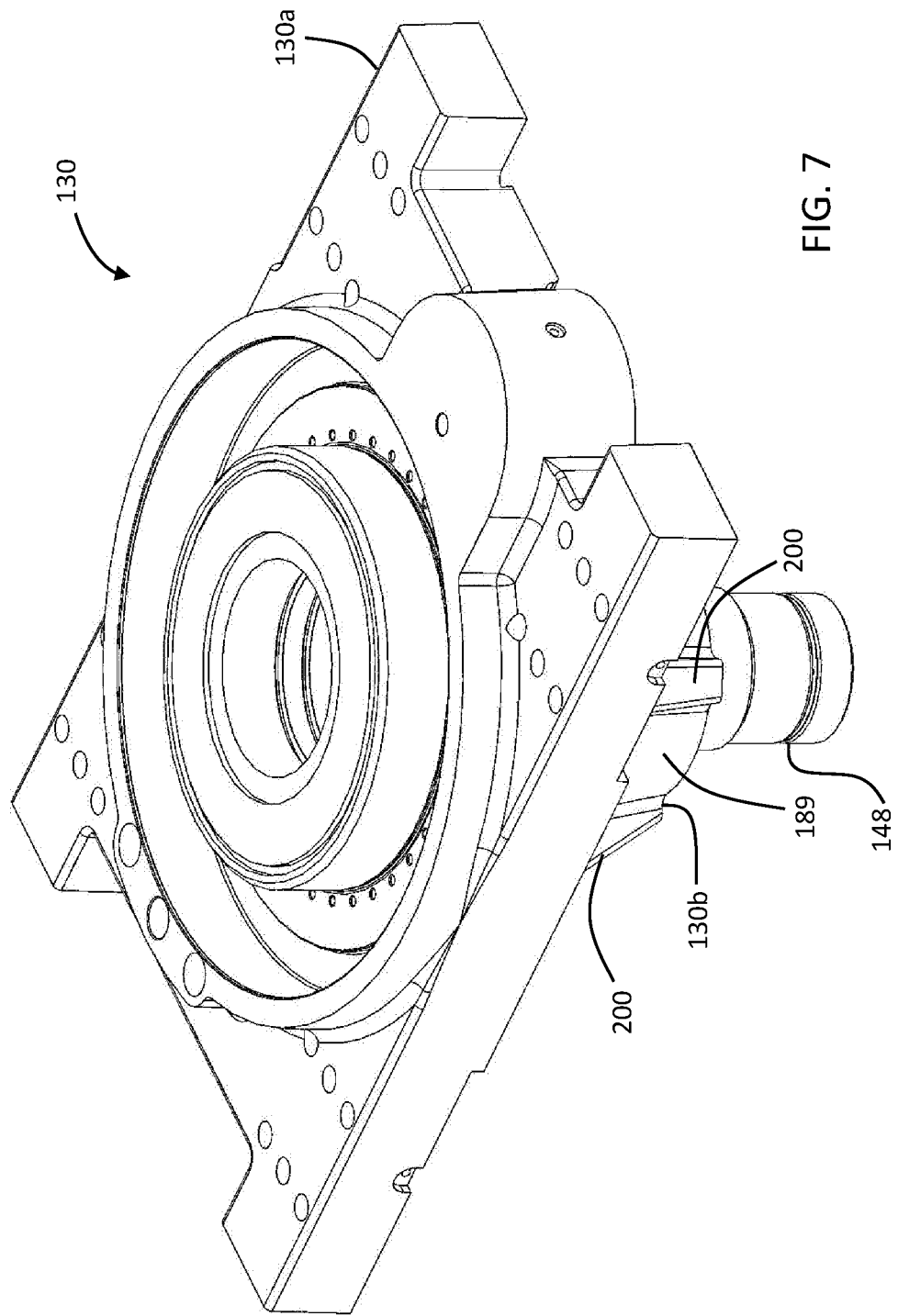
FIG. 7 is a perspective view of a portion of the machine of FIG. 1.

With reference also to FIG. 6, the rotary apparatus 120 further includes a table 138 mounted atop the carriage body 130. The table 138 is rotatable relative to the carriage body 130 about a vertical table axis 140 for rotatably supporting the center mold assembly 121. In the example illustrated, the center mold assembly 121 includes horizontally opposed first and second center mold sections 121*a*, 121*b* (FIG. 1), and can optionally include horizontally opposed third and fourth center mold sections 121*c*, 121*d* (FIG. 5) supported perpendicular to the first and second center mold sections 121*a*, 121*b*.

Figure 10A:
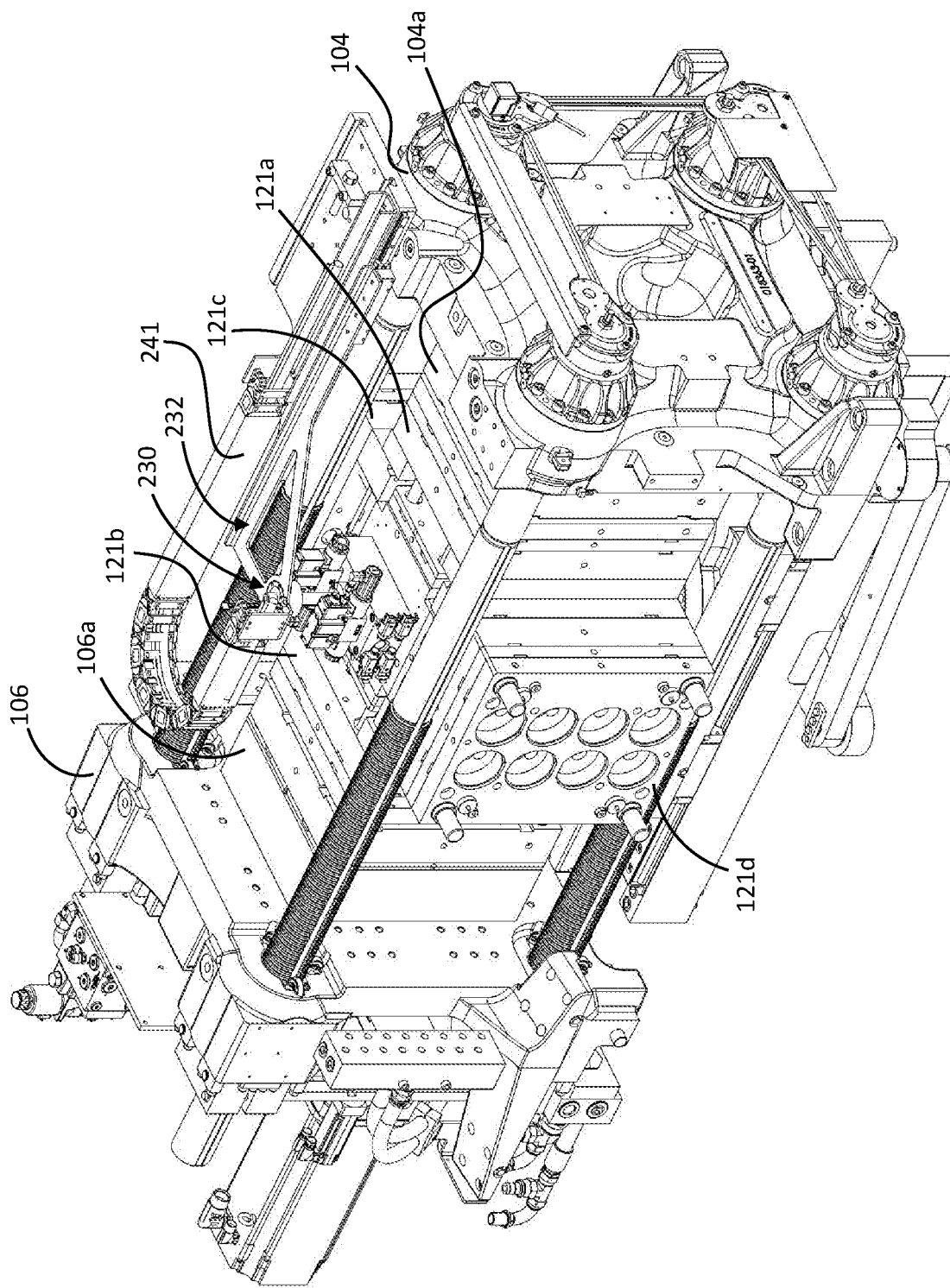
FIG. 10a is a perspective view of portions of the machine of FIG. 1.

In the example illustrated, when the machine 100 is in a mold-open condition, the table 138 is rotatable relative to the carriage body 130 about the vertical table axis 140 for moving the center mold sections 121*a-d* among axial positions directed toward the stationary and moving mold sections 104*a*, 106*a*, and lateral positions directed toward an operator side and a non-operator side of the machine 100. Referring to FIGS. 1 and 10*a*, in the example illustrated, the first and second center mold sections 121*a*, 121*b* are shown in the axial positions, with the first center mold section 121*a* directed toward the stationary mold section 104*a* and the second center mold section 121*b* directed toward the moving mold section 106*a*. The third and fourth center mold sections 121*c*, 121*d* are shown in the lateral positions, with the third center mold section 121*c* directed toward the operator side of the machine 100 and the fourth center mold section 121*d* directed toward the non-operator side of the machine 100.

Figure 10B:
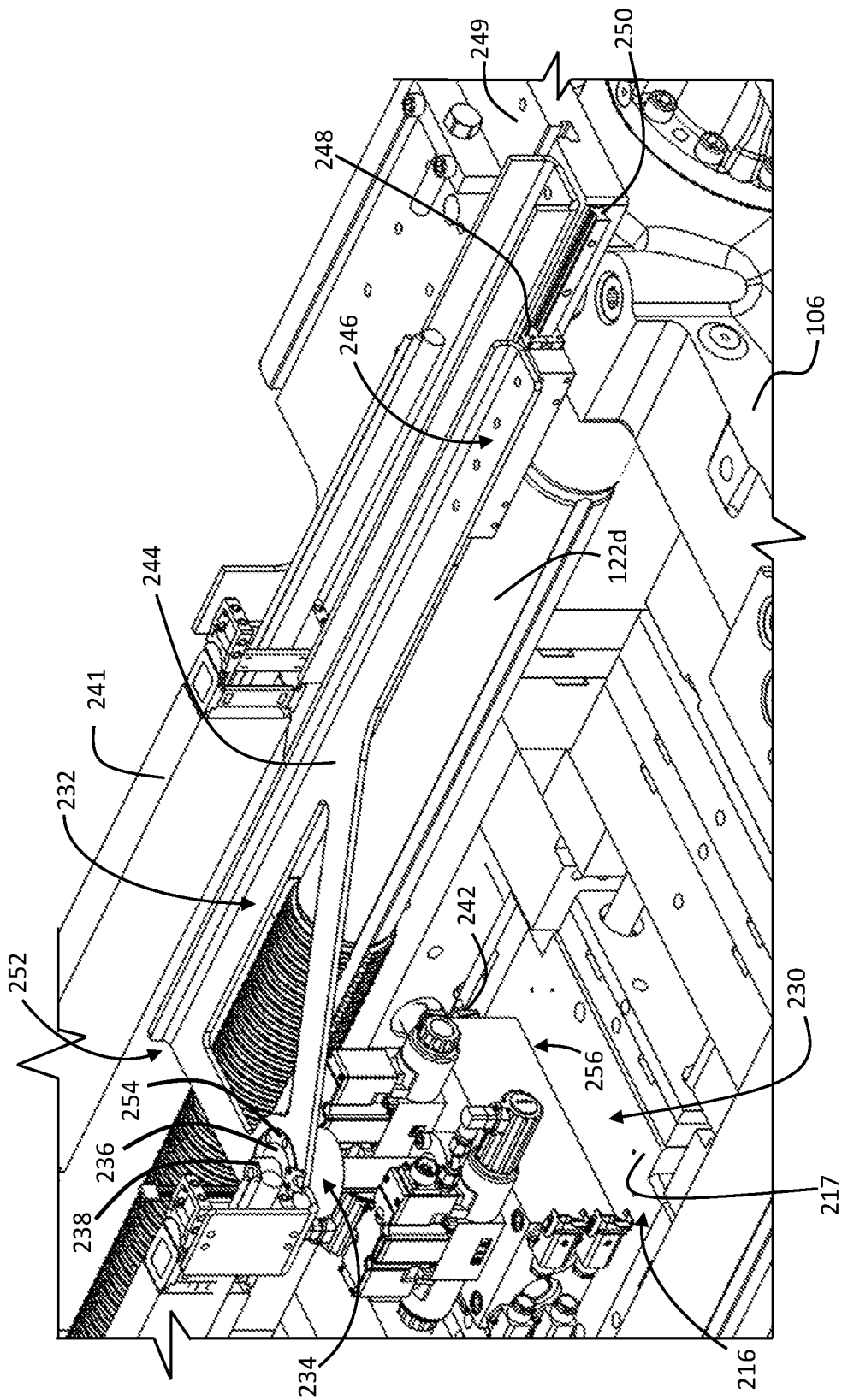

When the machine 100 is in the mold-closed condition (FIG. 10*a*), the moving platen 106 and the rotary apparatus 120 are in respective advanced (mold-closed) positions nearest the stationary platen 104, and the center mold assembly 121 has one center mold section in engagement with the stationary mold section 104*a* (shown in FIG. 10*a* as the first center mold section 121*a*) and an axially opposite center mold section in engagement with the moving mold section 106*a* (shown in FIG. 10*b* as the second center mold section 121*b*). When the machine 100 is in the mold-open condition (FIG. 1), the moving platen 106 and the rotary apparatus 120 are in respective retracted (mold-open) positions spaced axially apart from the respective advanced positions, and the center mold sections in the axial positions are spaced axially apart from the stationary mold section 104*a* and the moving mold section 106*a*.

With reference again to FIG. 3, in the example illustrated, the table 138 is mounted to the carriage body 130 by a single table bearing 152 having a combination of bearing elements 153*a*, 153*b*, 153*c* for bearing axial, rotational, and moment loads. The bearing elements 153*a*, 153*b*, 153*c* are contained between a first race 154*a* fixed in abutting relation to a bottom surface of the table 138 and a second race 154*b* fixed in abutting relation to an opposed upper surface of the upper portion 130*a* of the carriage body 130.

In the example illustrated, the first race 154*a* is secured to the table 138 by fasteners 155, and these same fasteners 155 also engage an annular drive gear 156 to fix the gear 156 to the table 138. The gear 156 is engaged by a pinion 157 driven by a motor 158 to control rotation of the table 138.

Referring to FIG. 4, in some examples, the carriage rails 132*a*, 132*b* are generally tangential to the table bearing 152 when viewed along the table axis 140. Each carriage rail 132*a*, 132*b* has a respective carriage rail width 136*a*, 136*b*, and a diameter 159 of the table bearing 152 can be generally equal to a sum of the carriage rail spacing 134 plus the carriage rail widths 136*a*, 136*b*.

Continuing to refer to FIG. 4, in the example illustrated, the table 138 has a table lateral extent 139 when the machine 100 is in a mold-closed condition. The table lateral extent 139 is greater than the carriage rail spacing 134.

Referring to FIG. 6, in the example illustrated, the carriage body 130 has a carriage upper portion 130*a* and a carriage lower portion 130*b* extending downward from the carriage upper portion 130*a*. The carriage upper portion 130*a* and lower portion 130*b* are of integral, unitary construction, and in the example illustrated, are part of a unitary casting.

The carriage upper portion 130*a* has an underside surface 144 that, in the example illustrated, extends laterally outwardly of an upper end of the lower portion 130*b* and that is supported by the first and second carriage rails 132*a*, 132*b*. The first and second carriage rails 132*a*, 132*b* are, in the example illustrated, mounted to respective first and second carriage beams 146*a*, 146*b*. The carriage lower portion 130*b* extends downward from the carriage upper portion 130*a*, laterally intermediate the first and second carriage rails 132*a*, 132*b* and the first and second carriage beams 146*a*, 146*b*.

The rotary apparatus 120 can include an actuator connection portion 148 for attachment to an actuator 150 for urging translation of the rotary apparatus 120 along the machine axis 112. In the example illustrated, the actuator connection portion 148 is fixed to the carriage lower portion 130*a* and extends below a lowermost extent 151*a*, 151*b* of the carriage beams 146*a*, 146*b*. The actuator connection portion 148 comprises a generally cylindrical boss 148*a* coaxial with the table axis 140 in the example illustrated. A link member 150*a* of an actuator **150* is rotatably coupled to the cylindrical boss 148*a*. The link member 150*a* is rotatable about the table axis 140 in a generally horizontal plane, and is disposed below the carriage beams 146*a*, 146*b*. In the example illustrated, the actuator connection portion 148 is of unitary, integral construction with the carriage lower portion 130*b*.

Referring still to FIG. 6, in the example illustrated, the carriage body 130 further includes a central bore 164 having a central bore upper end 164*a* proximate the table 138 and a central bore lower end 164*b* disposed in the carriage lower portion 130*b* and spaced vertically below the bore upper end 164*a*. The carriage body 130 includes a central bore sidewall 166 extending between the bore upper and lower ends 164*a*, 164*b* and a bore endwall 168 extending radially inwardly of the bore 164 adjacent the bore lower end 164*b*. The bore endwall 168 is, in the example illustrated, of integral, unitary construction with the carriage body 130, and disposed vertically intermediate the central bore 164 and the cylindrical boss 148*a* of the actuator connection portion 148. The bore endwall 168 extends radially across the bore lower end 164b to provide the central bore 164 with a generally closed bottom.

In the example illustrated, the rotary apparatus 120 further includes a rotary union 170 received in the central bore 164 of the carriage body 130. The rotary union 170 is fixed to the table 138 and rotatable about the table axis 140 with the table 138. The rotary union 170 has an upper union end 170a adjacent the table 138 and a lower union end 170b seated adjacent the bore endwall 168.

In the example illustrated, rotation of the rotary union 170 within the central bore 164 of the carriage body 130 is controlled by the table bearing 152 alone. For example, the rotary apparatus 120 is free of bearings disposed radially between an outer surface of the rotary union 170 and an inner surface of the central bore 164 of the carriage body 130.

Referring again to FIG. 3, in the example illustrated, the rotary union 170 includes a generally cylindrical body 172 with a plurality of annular grooves 174 in an outer surface thereof for fluid communication with respective inner ends 175 of a plurality of carriage body conduits 176 (one of which is shown schematically in FIG. 6) extending through the carriage body 130. The rotary union 170 can include a plurality of internal union conduits 178 having union conduit lower ends 180a in fluid communication with respective ones of the annular grooves 174 and union conduit upper ends 180b open to a union top surface 182 of the rotary union 170 for connection to internal block conduits 184 (FIG. 2) in the center mold assembly 121.

In the example illustrated, the table 138 has a central aperture 186, and the union conduit upper ends 180b are accessible through the central aperture 186. An upper portion 188 of the rotary union 170 extends through the central aperture 186, in the example illustrated.

Figure 8:
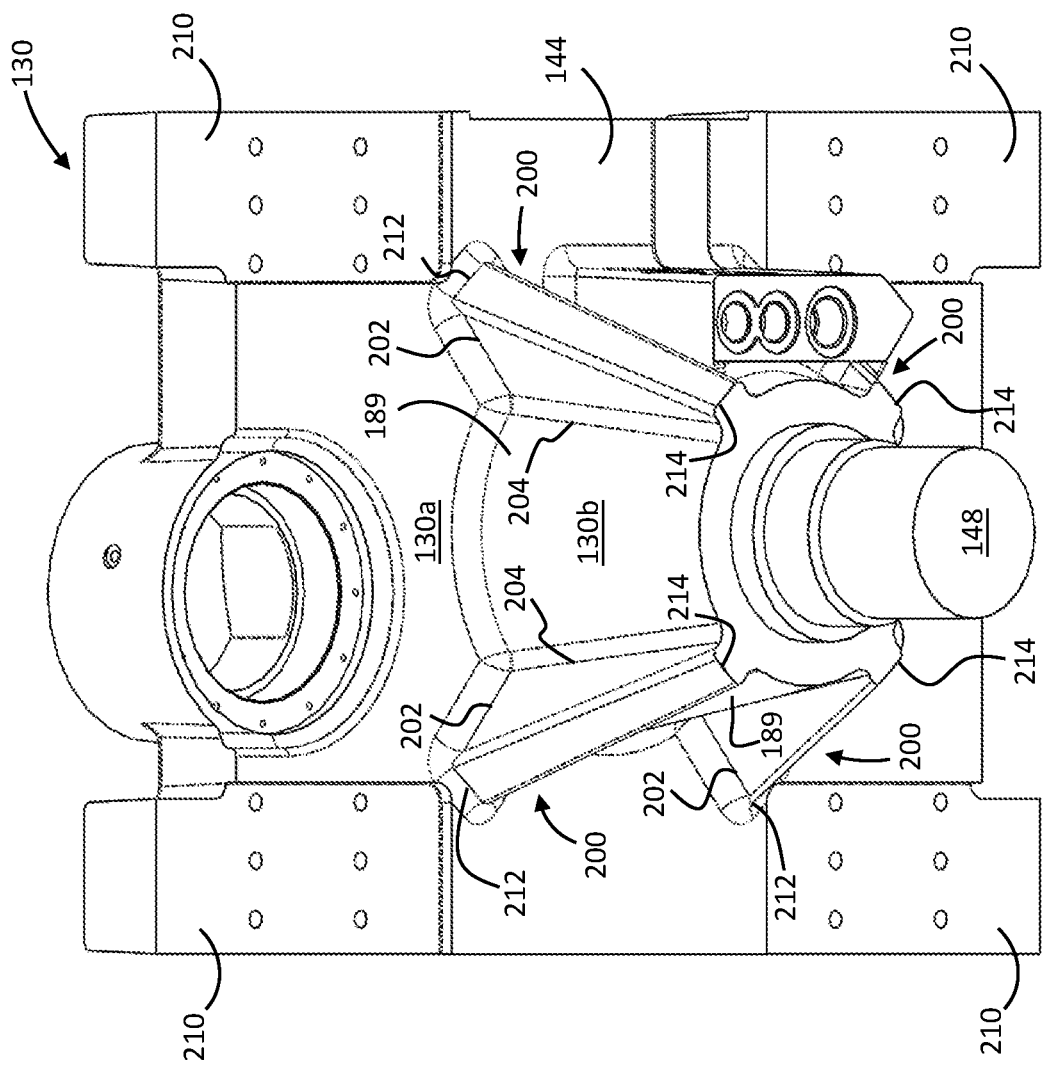
FIG. 8 is an enlarged bottom perspective view of a carriage body portion of the structure of FIG. 7.

Referring to FIG. 6, in the example illustrated, the lower portion 130b of the carriage body 130 has an outer surface 189 opposite the inner surface of the central bore 164, the outer surface 189 having a generally inverted frusto-conical shape. Referring to FIG. 8, in the example illustrated, the lower portion 130b of the carriage body 130 further includes a plurality of gussets 200, with each gusset 200 oriented in a generally vertical plane and having a generally laterally extending gusset top edge 202 fixed to the underside surface 144 of the upper portion 130a of the carriage body 130, and a generally vertically extending gusset inner side edge 204 fixed to the outer surface 189 of the lower portion 130b of the carriage body 130. The gussets 200 are, in the example illustrated, of integral, unitary construction with the carriage body 130.

Figure 9:
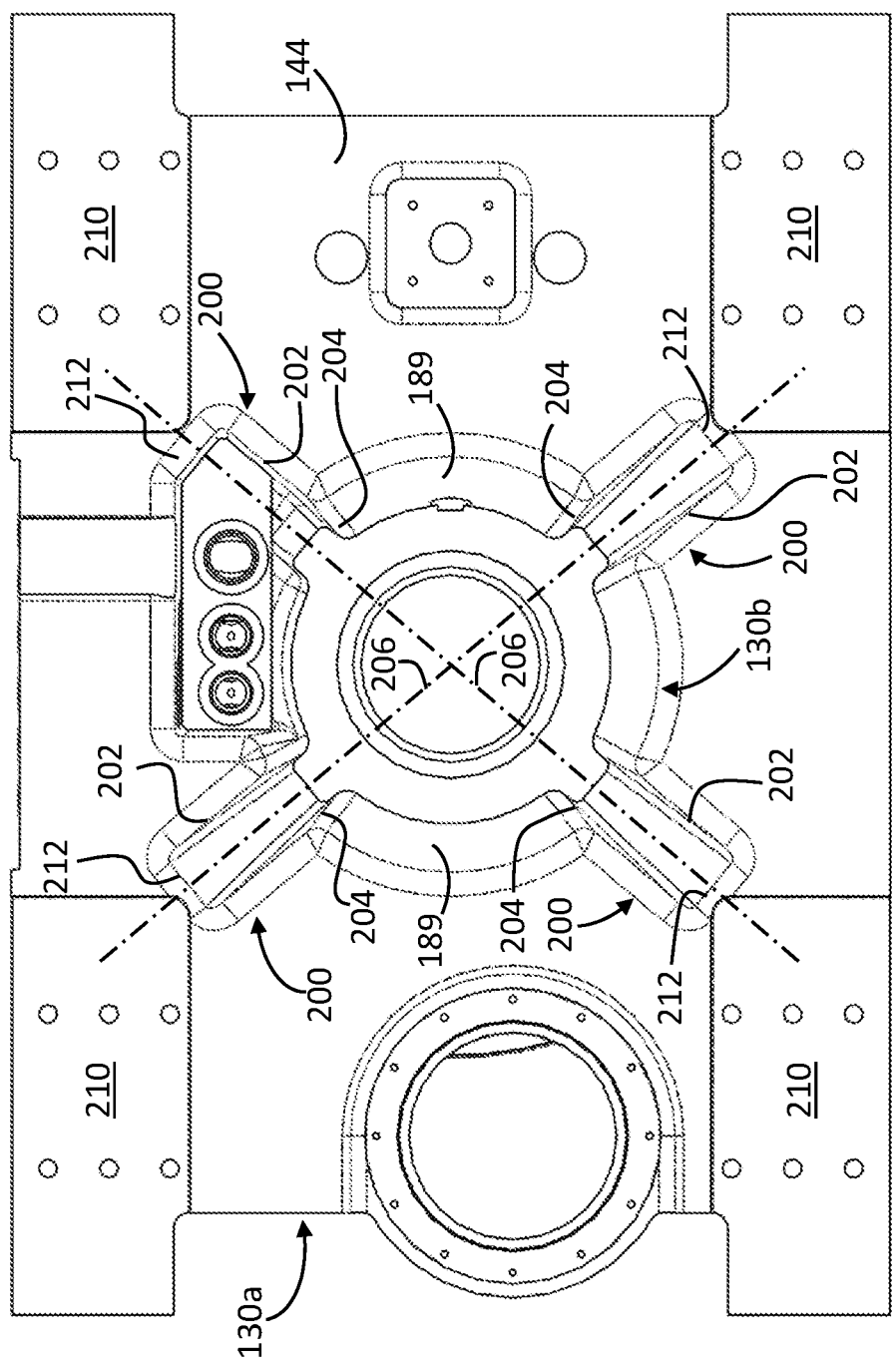
FIG. 9 is a bottom plan view of the carriage body portion of FIG. 8.

Referring to FIG. 9, in some examples, the gussets 200 are aligned, when viewed from above, along lines 206 extending generally from the table axis 140 to load bearing contact points of the carriage body 130, the load bearing contact points for transferring loads from the carriage body 130 to the carriage rails 132a, 132b. In the example illustrated, the load bearing contact points include carriage bearing shoes 208 (FIGS. 3 and 6) mounted to the underside surface 144 of the upper portion 130a of the carriage body 130. The upper portion 130a of the carriage body 130 has a generally rectangular profile when viewed from above, and a total of four carriage bearing shoes 208 are provided, one at each corner of the upper portion 130a of the carriage body 130. A total of four gussets 200 are provided, each gusset 200 directed towards a respective one of the carriage bearing shoes 208.

In the example illustrated, the top edge 202 of each gusset 200 extends on a diagonal generally corresponding to the shortest distance between the outer surface 189 of the lower portion 130b of the carriage body 130 and a respective one of the bearing shoes 208. In the example illustrated, the outboard end of each gusset top edge 202 is proximate a respective bearing shoe 208.

Referring to FIG. 8, in the example illustrated, the underside surface 144 of the upper portion 130a of the carriage body 130 is provided with mounting pads 210 to which the bearing shoes 208 are mounted. The mounting pads 210 are, in the example illustrated, in the form of pockets machined into the underside of the upper portion 130a of the carriage body 130. The top edge 202 of each gusset 200 terminates at a gusset outer end 212, and the gusset outer end 212 is located at a periphery of a respective mounting pad 210. The side edge 204 of each gusset terminates at a gusset lower end 214, and the gusset lower end 214 is disposed at an elevation generally equal to that of the bore endwall 168 of the central bore 164 of the carriage body 130.

The gussets 200 and the closed bottom of the carriage body 130 may help increase the rigidity of the carriage body 130, which may help reduce maintenance intervals and/or increase mold life in some applications.

Referring now to FIGS. 2 and 5, in the example illustrated, the center mold assembly 121 includes a center mold support block 216 having a block lower end 218 fixed to the table 138, and a plurality of vertical faces including at least horizontally opposed first and second faces 220a, 220b (FIG. 2) for supporting the first and second center mold sections 121a, 121b. In the example illustrated, the mold support block 216 further includes horizontally opposed third and fourth faces 220c, 220d (FIG. 5) for supporting the third and fourth center mold sections 121c, 121d. The third and fourth faces 220c, 220d are perpendicular to the first and second faces 220a, 220b.

Referring to FIG. 2, in the example illustrated, the mold support block 216 includes, in the example illustrated, internal block conduits 184 in fluid communication with the union conduit upper ends 180b of the rotary union 170. Referring to FIG. 5, the block lower end 218 includes an optional adapter plate 224 having a plate thickness 226 sized to vertically align the center mold sections 121a-d with the stationary and moving mold sections 104a, 106a, and internal plate conduits 228 to provide fluid communication between the internal block conduits 184 and the union conduits 178.

With reference also to FIG. 5, in the example illustrated, the rotary apparatus 120 further includes an optional services distribution assembly 230 disposed above the center mold support block 216. The services distribution assembly 230 can facilitate providing services (e.g. electrical connection and/or fluid connection) to the center mold assembly 121 in a way that accommodates the translation and rotation of the center mold assembly 121. For example, the services distribution assembly 230 can include one or more services connectors each having a rotor member fixed to rotate with the table 138 relative to the carriage body 130, and a stator member generally inhibited from rotating relative to the carriage body 130. The rotor and stator members of each service connector can be coupled together to conduct services across the respective service connector. This can help avoid twisting and/or wrapping of cables or other service lines during rotation of the table 138 (and the center mold assembly 121). The services distribution assembly 230 can further include an anti-rotate stay 232 for attachment to the stator member of each service connector. The anti-rotate stay 232 can maintain a generally fixed rotational orientation relative to the carriage body 130.

In the example illustrated, and with reference to FIGS. 10a and 10b, the services distribution assembly 230 includes a first service connector in the form of a rotary electrical connector 234. The electrical connector 234 provides electrical service to the center mold assembly from at least one upstream electrical supply conductor that is generally stationary relative to the machine base. In the example illustrated, connection to a generally stationary electrical supply conductor is provided via stator leads 239 and a cable track 241 (FIG. 10a).

In the example illustrated, the electrical connector 234 includes an electrical rotor member 236 fixed to rotate with the center mold support block and an electrical stator member 254 adjacent the rotor member 236 and fixed to the anti-rotate stay 232. In the example illustrated, the stator member 254 is translatable with the carriage body 130 and free of attachment to the tie bars 122. The rotor member 236 is rotatably coupled to the stator member 254. The electrical connector 234 provides electrical communication between the upstream electrical supply conductor and a downstream conductor (e.g. electrical rotor leads 240 and wiring 243) connected to at least one valve (e.g. valves 257a, 257b) fixed to a manifold (e.g. manifold 256) for controlling flow through the manifold.

Figure 11:
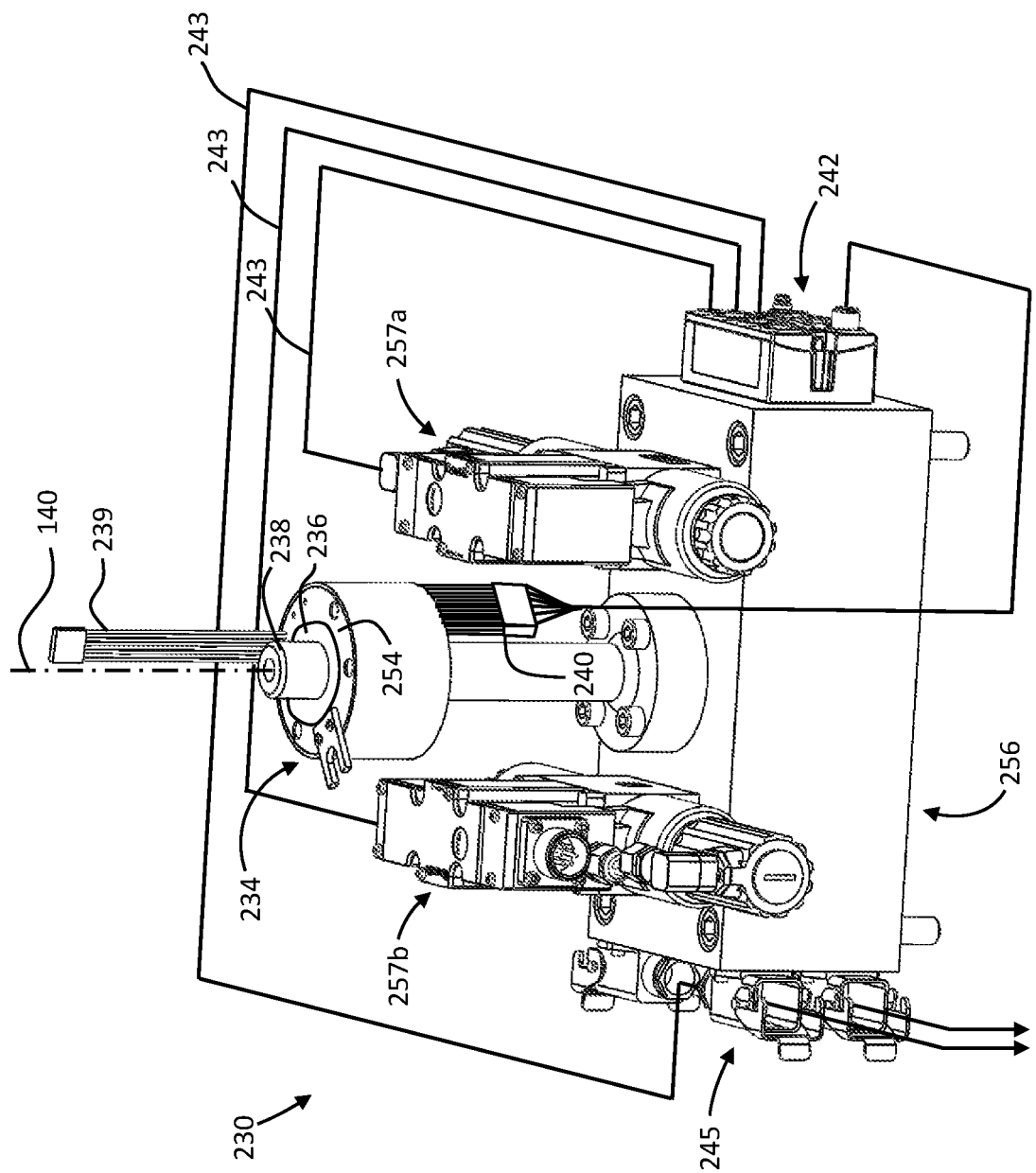
FIG. 11 is an enlarged perspective view of portions of a distribution system of the machine of FIG. 1.

In the example illustrated, the rotor member 236 is mounted to a vertical, upper shaft 238 fixed to rotate with, and extending above, the center mold support block 216 (see also FIG. 11). Referring to FIG. 11, a plurality of electrical rotor leads 240 extend from the electrical rotor member 236, and in the example illustrated, extend to an I/O block 242 fixed to the center mold support block 216. Wiring 243 from the I/O block 242 can transmit signals for communicating with, for example, mold accessories, such as, for example, mold ejector valves, position sensors, etc. The wiring 243 can be connected to, for example, a junction box 245 for connecting the mold accessories.

Referring to FIG. 10b, in the example illustrated, the anti-rotate stay 232 includes an overhanging end of a support arm 244. In the example illustrated, the support arm 244 is slidably mounted to the stationary platen 104. The machine includes a mounting plate 249 secured to the stationary platen 104 and a horizontal rail 250 fixed to the mounting plate 249. The support arm 244 is slidably coupled to the horizontal rail 250. In the example illustrated, the support arm 244 has a proximal end 246 to which a bearing block 248 is fastened. The bearing block 248 engages the rail 250. The support arm 244 has a distal end 252 to which the electrical stator member 254 of the electrical connector 234 is secured. As the rotary apparatus 120 translates towards and away from the stationary platen 104, the connection between the electrical stator member 254 and the support arm 244 urges a corresponding translation of the support arm 244.

The distribution assembly 230 further includes, in the example illustrated, a manifold 256 is fixed to an upper surface 217 of the center mold support block 216 and in fluid communication with a rotary union 6170. The manifold 256 provides fluid communication between the internal block conduits 184 and mold accessories in the center mold sections, for example, mold ejection cylinders. Referring to FIG. 11, the distribution assembly 230 can include valves mounted to the manifold 256 to control fluid flow through the manifold 256. In the example illustrated, the services distribution assembly 230 includes two valves—a first valve 257a associated with the first and second center mold sections 121a, 121b, and a second valve 257b associated with the third and fourth center mold sections 121c, 121d.

Figure 12:
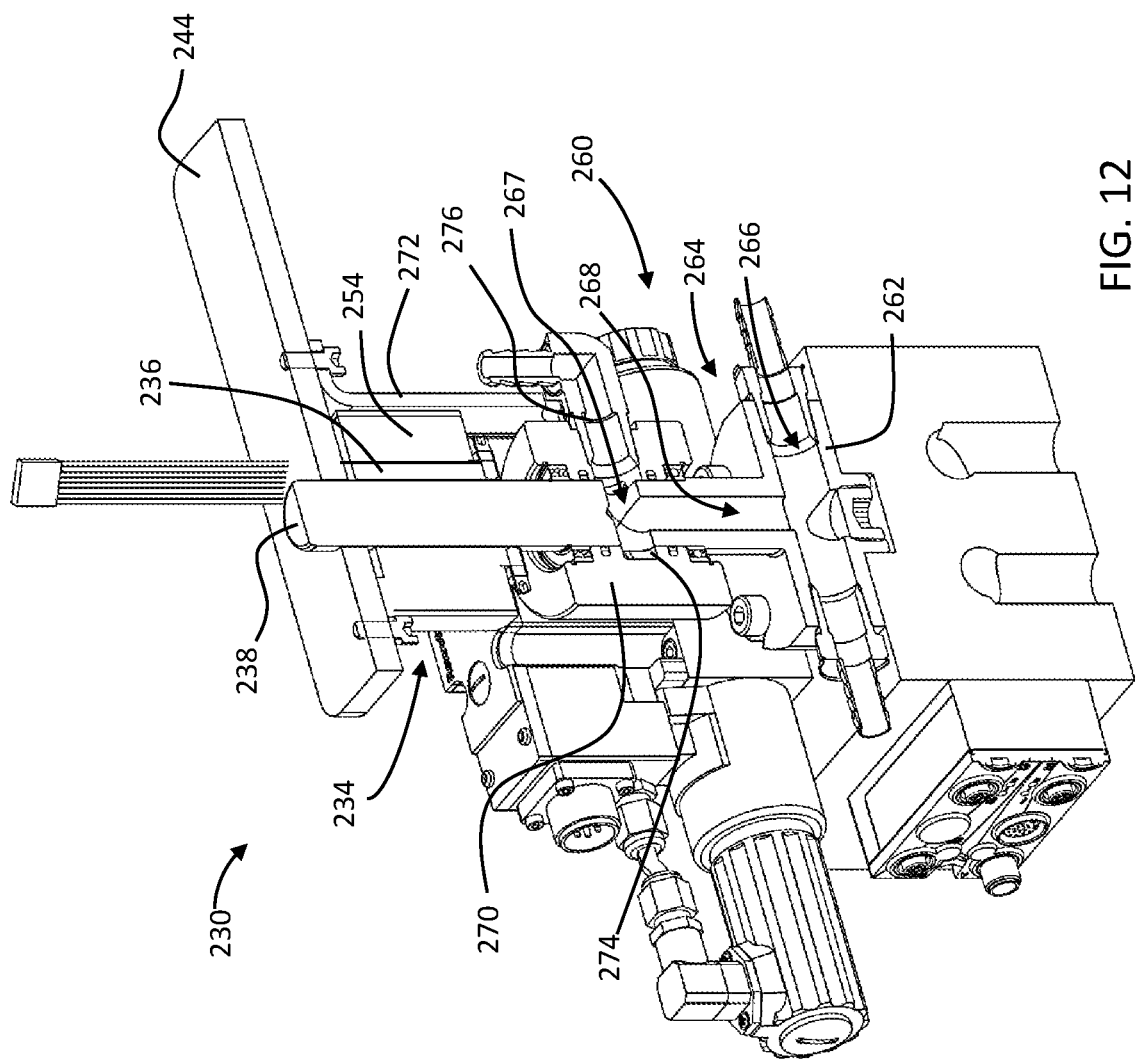
FIG. 12 is a cross-sectional perspective view of a distribution system similar to that of FIG. 11, but with an additional service connector.

Referring now to FIG. 12, the services distribution assembly 230 can further include an optional second service connector in the form of a pneumatic connector 260. The pneumatic connector 260 includes a pneumatic rotor member 262 that is, in the example illustrated, integral with a lower portion 264 of the shaft 238, and includes at least one outlet bore 266 in communication with a central transfer bore 268 extending along the lower portion 264 of the length of the shaft 238, between the outlet bore 266 and at least one intake bore 267.

The pneumatic connector 260 includes a pneumatic stator member 270 that is fixed to the support arm 244 (via a bracket 272, in the example illustrated). The pneumatic stator member 270 has an annular cavity 274 that circumscribes the openings to the intake bore 267 of the pneumatic rotor member 262. An inlet port 276 (for connection to an air supply conduit) passes through a sidewall of the pneumatic stator member 270, to the annular cavity 274.

Figure 13:
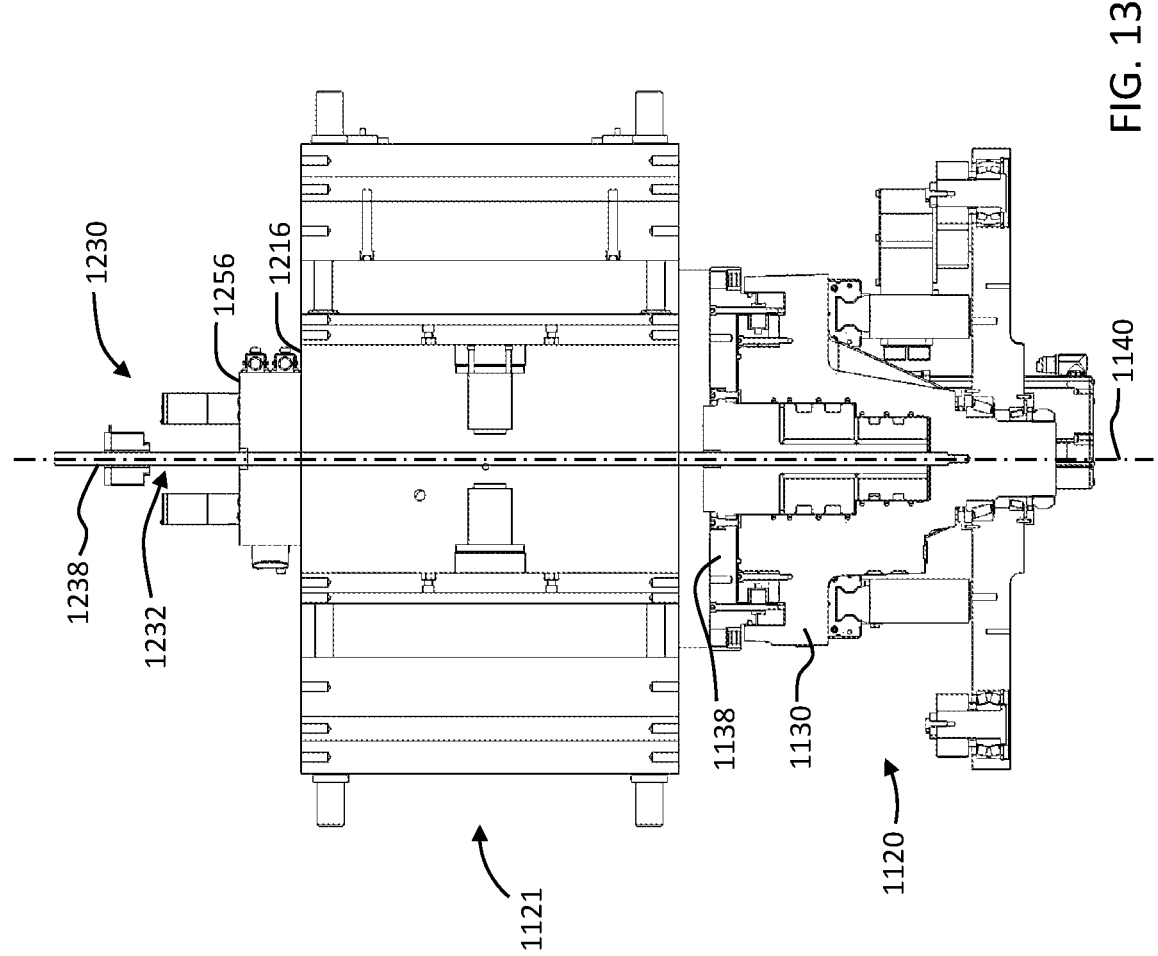
FIG. 13 is a cross-sectional end view of portions of another injection molding machine like that of FIG. 1.

Referring now to FIG. 13, another example of a rotary apparatus 1120 is illustrated. The rotary apparatus 1120 is similar to the rotary apparatus 120, and like features are identified by like reference characters, incremented by 1000.

The rotary apparatus 1120 includes a carriage body 1130 and a table 1138 supported by the carriage body 1130 and rotatable about a table axis 1140. A center mold assembly 1121 is mounted to the table 1138.

The rotary apparatus 1120 further includes a services distribution assembly 1230 having at least one service connector, a manifold 1256, and an anti-rotate stay 1232 for attachment to a stator member of each service connector.

Figure 14:
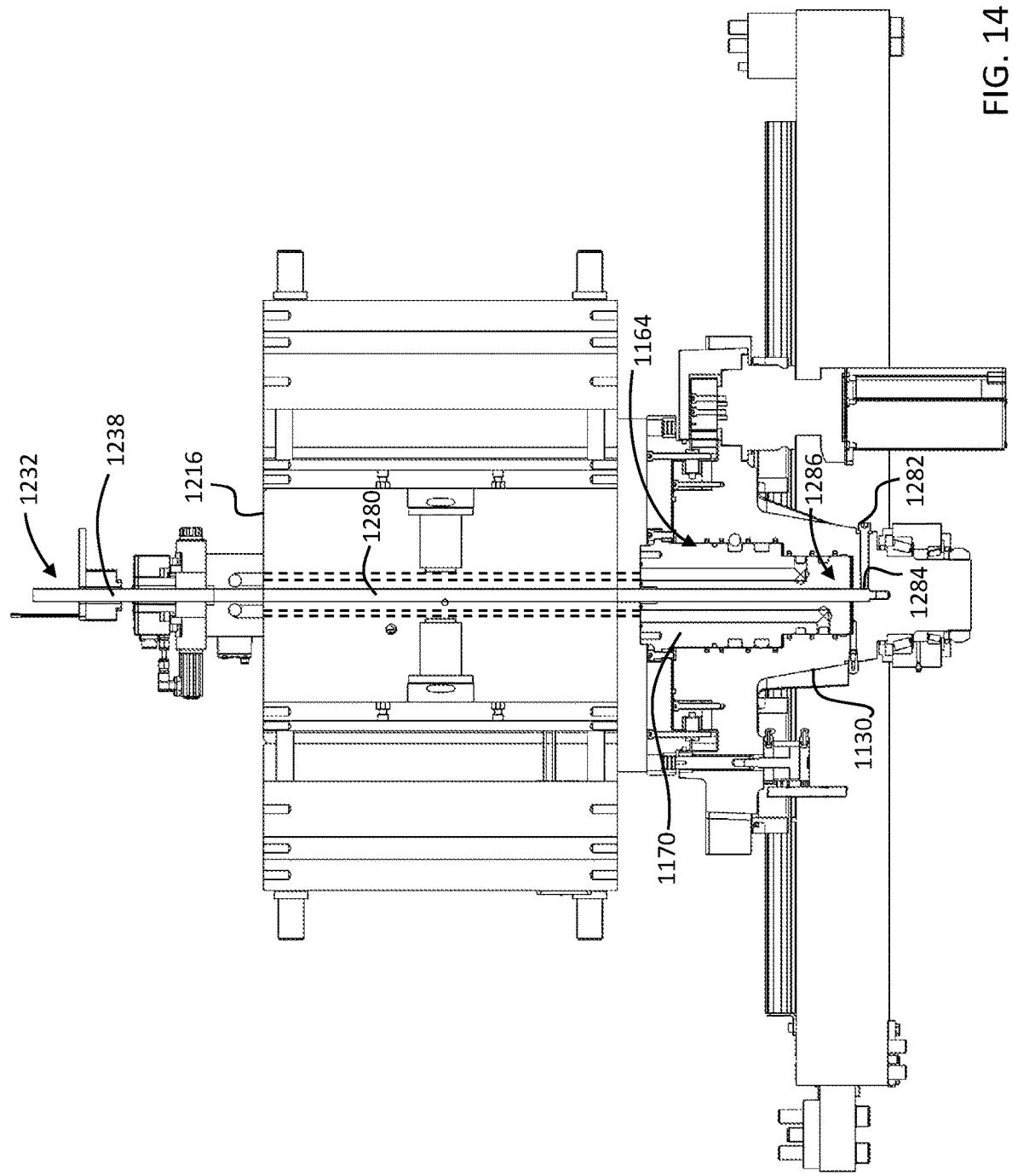
FIG. 14 is a cross-sectional side view of the portions of the machine of FIG. 13.

Referring to FIG. 14, in the example illustrated, the anti-rotate stay 1232 comprises an upper shaft 1238 that is disposed above the center mold support block 1216 and coaxial with the table axis 1140. The shaft 1238 maintains a generally fixed rotational position relative to the carriage body 1130. In the example illustrated, the shaft 1238 comprises an upper portion of a rod 1280 that extends vertically through the center mold support block 1216 and the rotary union 1170, and is anchored in the carriage body 1130. The block 1216 is rotatable about the rod 1280. A lock screw 1282 is in engagement with a flat 1284 in a lower end 1286 of the rod 1280 to inhibit rotation thereof. In the example illustrated, the lock screw 1282 is oriented horizontally, and extends through the carriage body 1130, below the closed bottom of the central bore 1164, to engage the flat 1284.

Figure 15:
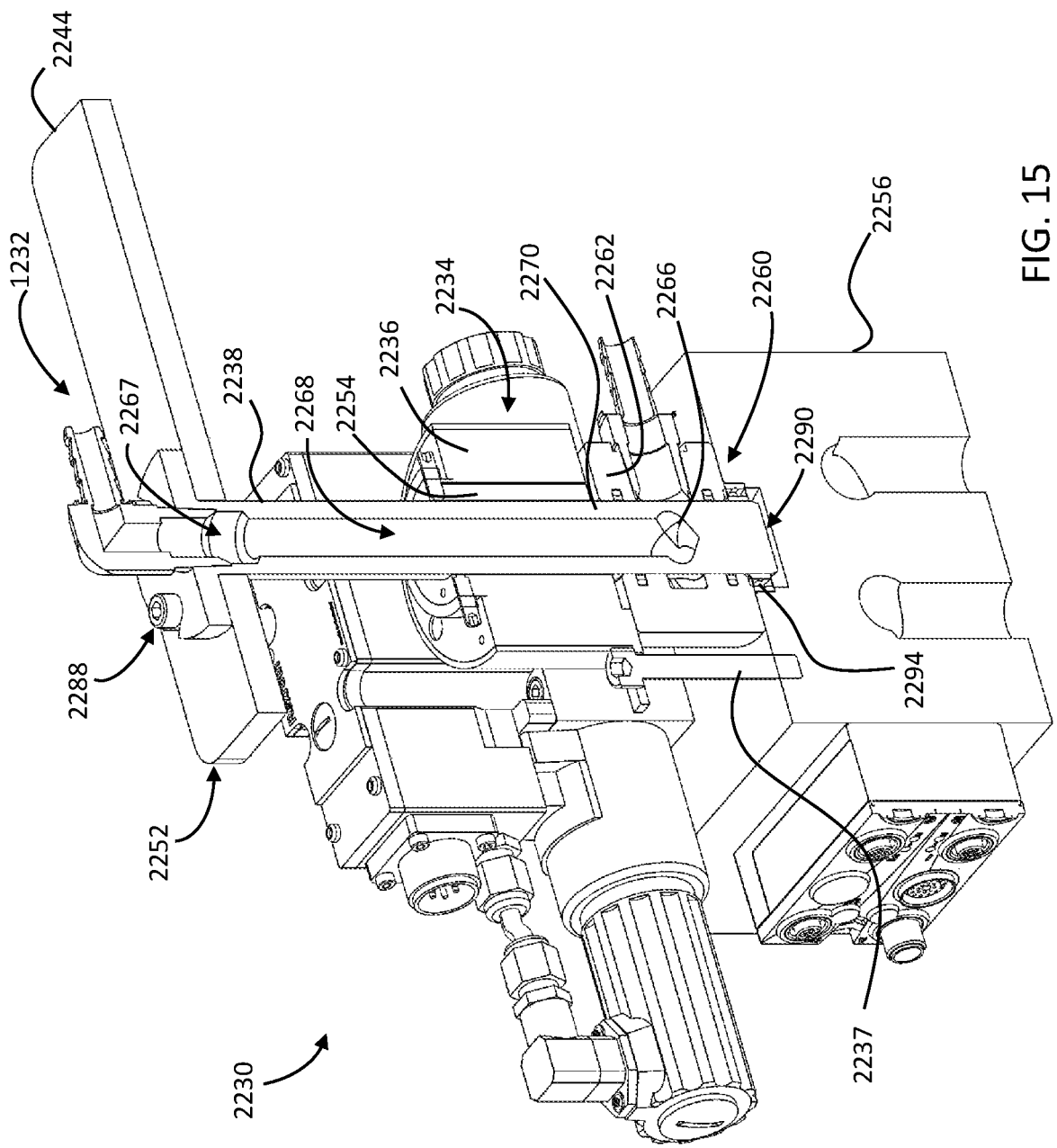
FIG. 15 is a cross-sectional perspective view of portions of another distribution system for an injection molding machine like that of FIG. 1.

Referring to FIG. 15, another example of a distribution assembly 2230 is illustrated. The distribution assembly 2230 is similar to the distribution assembly 230, and like features are identified by like reference characters, incremented by 2000.

The distribution assembly 2230 includes an anti-rotate stay 2232 comprising an upper shaft 2238 having an upper end 2288 fixed to a distal end 2252 of a support arm 2244. The shaft 2238 has a lower end 2290 that is coupled to an upper end of a manifold 2256 by a shaft bearing 2294 to facilitate rotation of the manifold 2256 relative to the shaft 2238.

The distribution assembly 2230 includes a first service connector in the form of an electrical connector 2234 with an electrical rotor member 2236 fixed to the manifold 2256 by, for example, bolts 2237, and an electrical stator member 2254 secured to the shaft 2238.

In the example illustrated, the services distribution assembly 2230 further includes a second services connector in the form of a pneumatic connector 2260. The pneumatic connector 2260 includes a pneumatic rotor member 2262 having a generally cylindrical housing fixed relative to the manifold 2256 and surrounding a lower portion of the shaft 2238 between the manifold 2256 and the electrical connector 2234. The pneumatic connector 2260 includes a pneumatic stator member 2270 that is, in the example illustrated, integral with the shaft 2238. The pneumatic stator member 2270 includes at least one outlet bore 2266 proximate the manifold 2256 and in communication with a central transfer bore 2268 extending along the length of the shaft 2238, between the outlet bore 2266 and at least one intake bore 2267 at the upper end 2288 of the shaft 2238.

Figure 16:
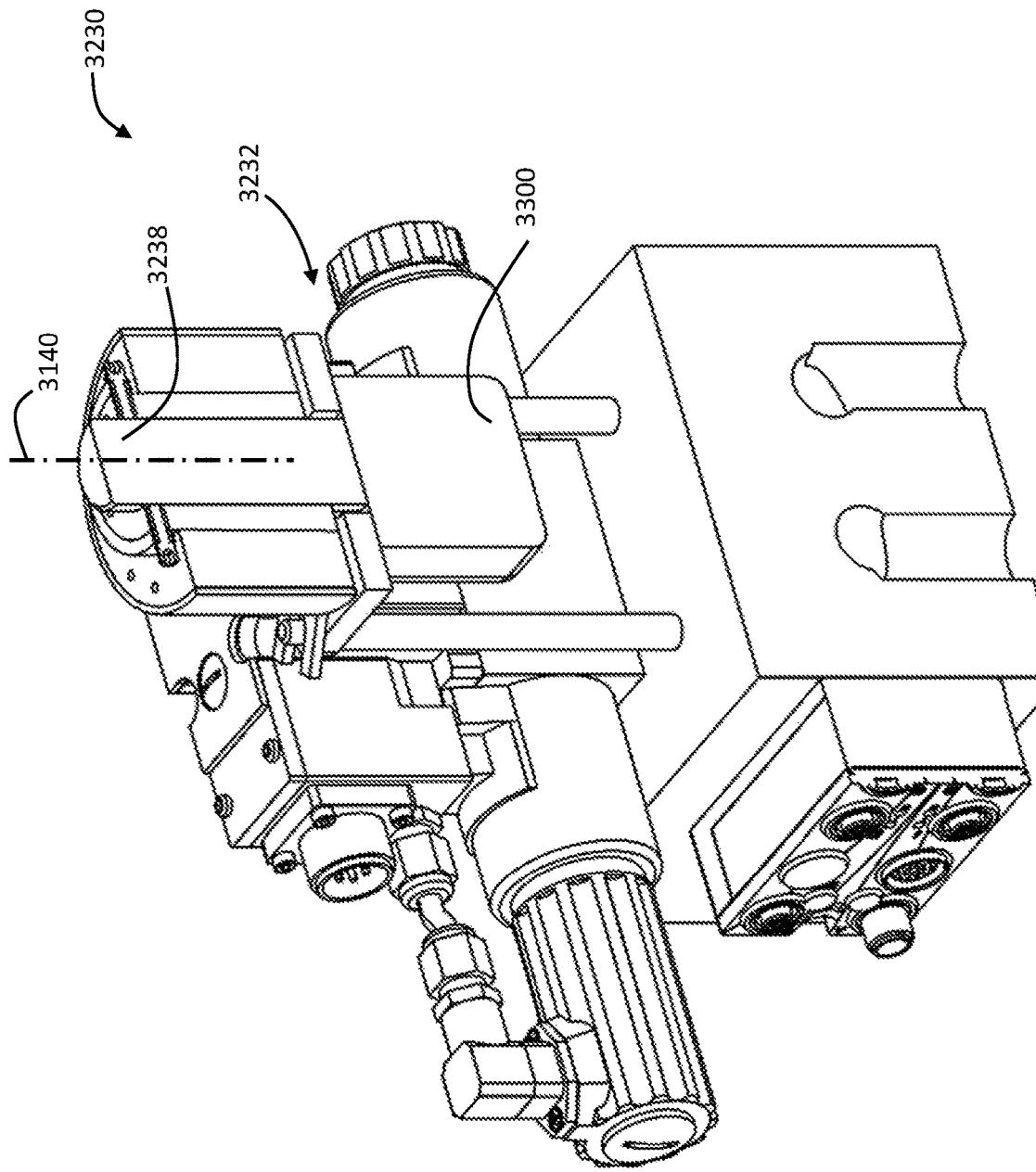
FIG. 16 is a cross-sectional perspective view of another distribution system for an injection molding machine like that of FIG. 1.

Referring now to FIG. 16, another example of a distribution assembly 3230 is illustrated. The distribution assembly 3230 is similar to the distribution assembly 130, and like features are identified by like reference characters, incremented by 3000.

In the example illustrated, the distribution assembly 3230 includes an anti-rotate stay 3232 in the form of an upper shaft 3238 disposed above the center mold support block and coaxial with the table axis 3140. In the example illustrated, the shaft 3238 includes a driveshaft coupled to a motor 3300. Rotation of the driveshaft is controllable by the motor 3300 to be generally equal in velocity and extent but opposite in direction in relation to rotation of the rotary table.

In the example illustrated, the motor 3300 comprises a servo motor for controlling rotation of the shaft 3238. In the example illustrated, the motor 3300 inhibits rotation of the shaft 3238 relative to the carriage body during rotation of the table by urging the shaft to rotate at a generally equal angular speed, but opposite direction, as the table. In other words, the shaft 3238 counter-rotates relative to the table, so that during rotation of the table relative to the carriage body, the shaft 3238 maintains a generally fixed rotational orientation relative to the carriage body.

Figure 17:
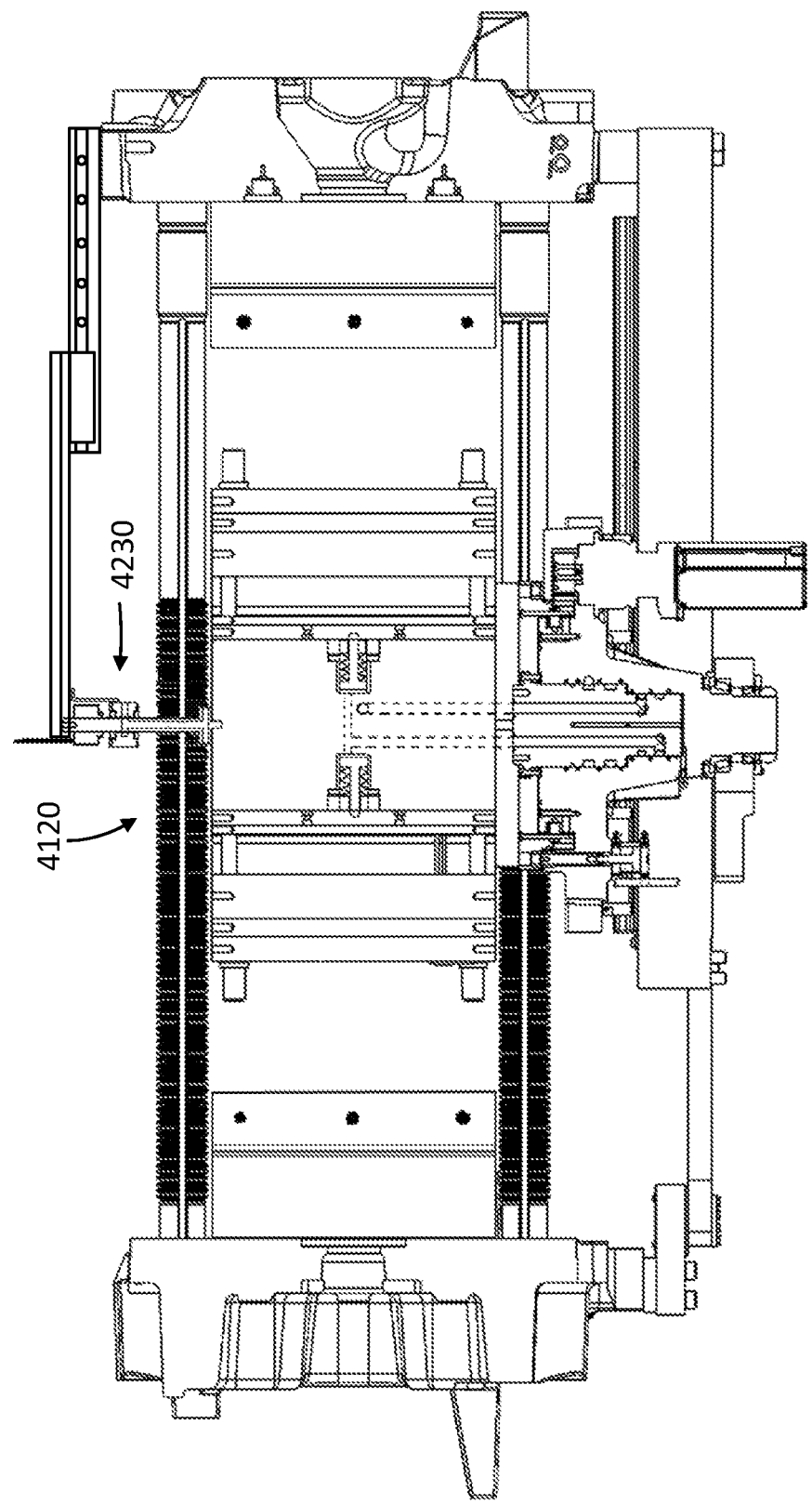
FIG. 17 is a cross-sectional side view of portions of another injection molding machine like that of FIG. 1.

In the various examples described above, the manifold 256, 1256, 2256, 3256 may be an optional element of the distribution assembly 230, 1230, 2230, 3230. For example, referring to FIG. 17, another example of a rotary apparatus 4120 is illustrated. The rotary apparatus 4120 is similar to the rotary apparatus 120 having the distribution assembly 230 of FIG. 12, and like features are identified by like reference characters, incremented by 4000.

Figure 18:
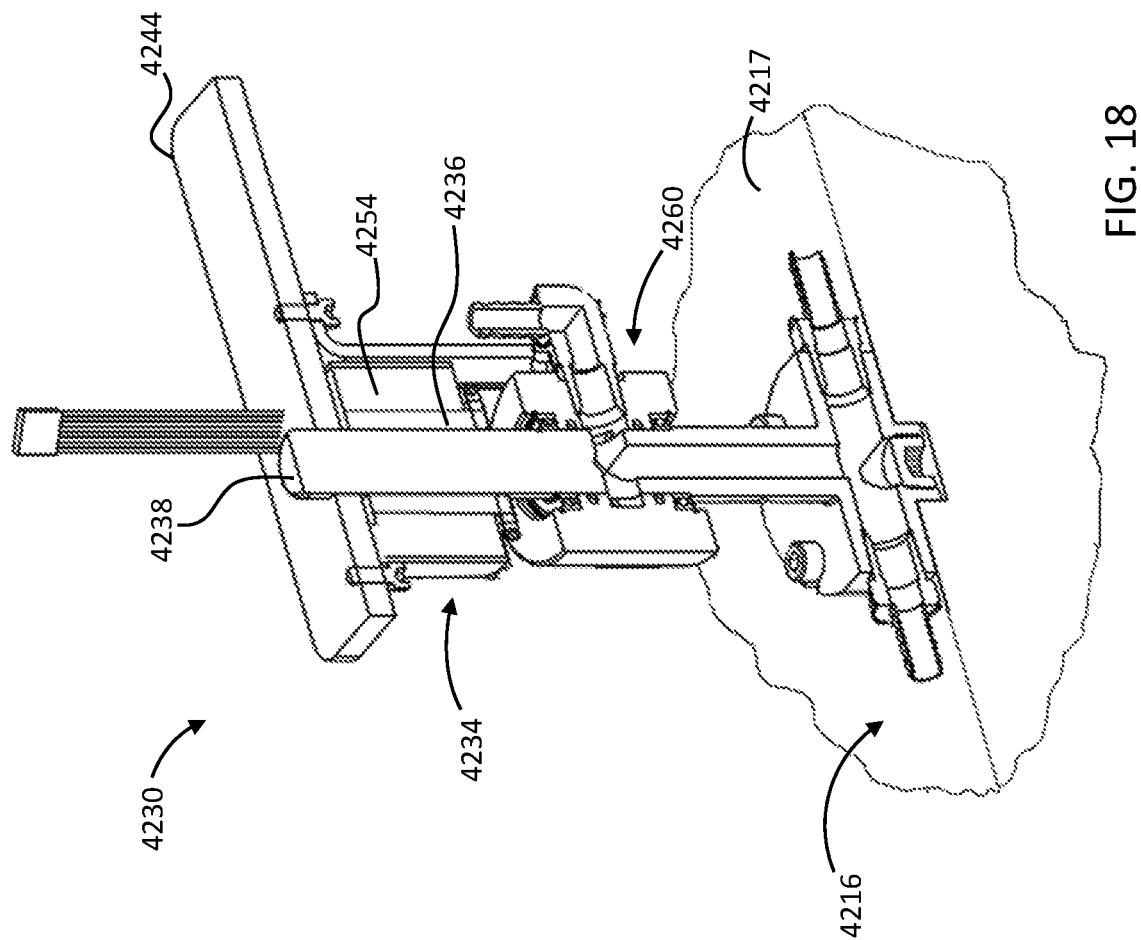
FIG. 18 is a cross-sectional perspective view of portions of a distribution system of the machine of FIG. 17.

Referring to FIG. 18, the rotary apparatus 4120 includes a distribution assembly 4230 having an upper shaft 4238 mounted to an upper surface 4217 of the center mold support block 4216. The distribution assembly 4230 is free of a manifold and valves atop the center mold support block 4216. The distribution assembly 4230 includes a first service connector in the form of an electrical connector 4234 having an electrical stator member 4254 fixed to a support arm 4244, and an electrical rotor member 4236 fixed to the shaft 4238. The distribution assembly 4230 further includes a second service connector in the form of a pneumatic connector 4260 that is similar to the pneumatic connector 260 of the distribution assembly 230 of FIG. 12.

Figure 19:
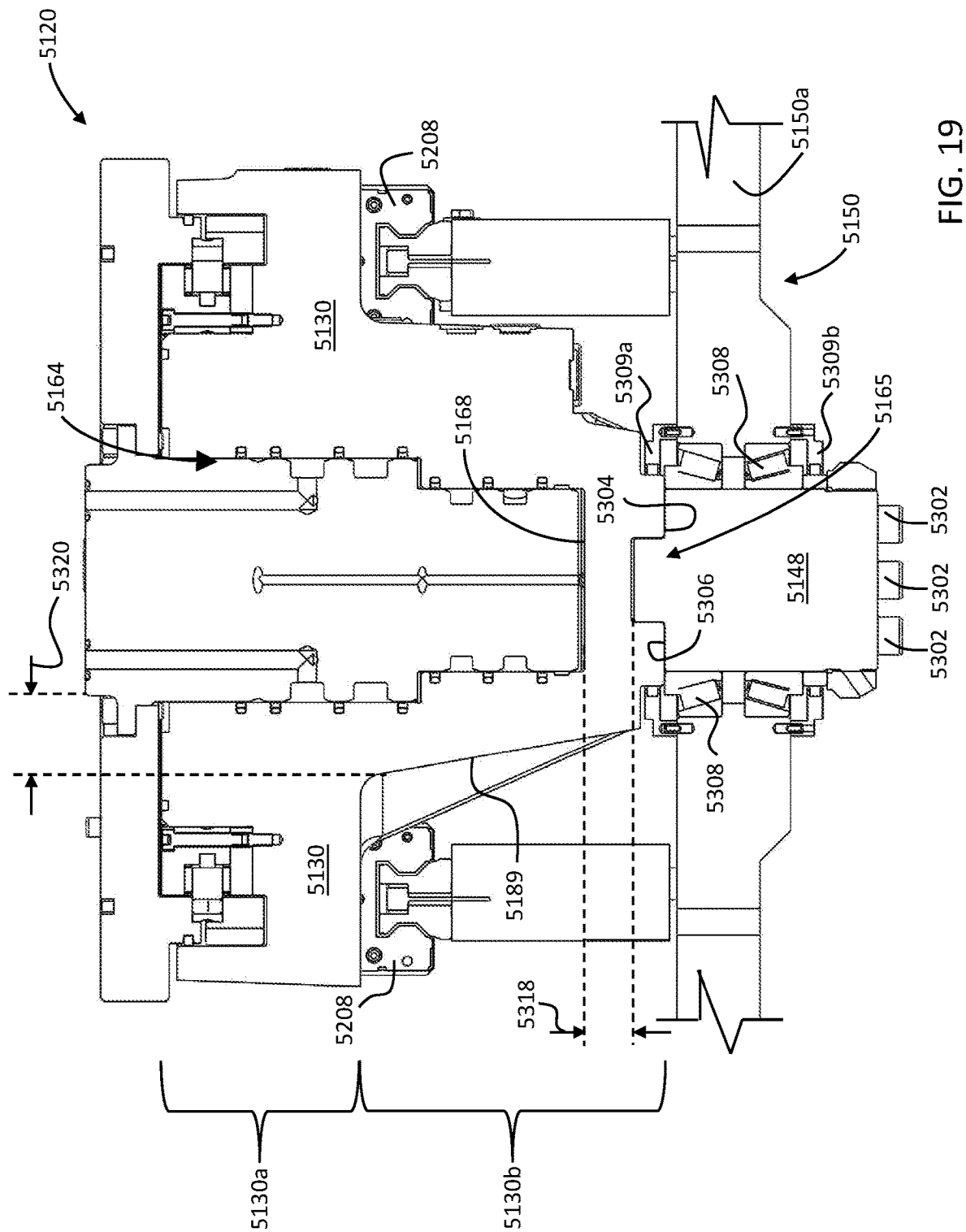
FIG. 19 is a cross-sectional end view of portions of another injection molding machine like that of FIG. 1.

Referring to FIG. 19, another example of a rotary apparatus 5120 is illustrated. The rotary apparatus 5120 is similar to the rotary apparatus 120, and like features are identified by like reference characters, incremented by 5000.

The rotary apparatus 5120 includes an actuator connection portion 5148 that, rather than being integrated with the carriage body 5130, is separately attachable and detachable to and from the lower portion 5130b of the carriage body 5130. In the example illustrated, the actuator connection portion 5148 is a generally cylindrical member that extends downward from the closed bottom 5165 of the central bore 5164. Bolts 5302 may be used to secure the actuator connection portion 5148 to the lower portion 5130b of the carriage body 5130. The bottom surface 5304 of the lower portion 5130b of the carriage body 5130 and the upper surface 5306 of the actuator connection portion 5148 may have complementary stepped surfaces to provide generally vertical abutment surfaces which can facilitate transferring a horizontal force from the actuator connection portion 5148 to the carriage body 5130.

In the example illustrated, the bore endwall 5168 is of integral, unitary construction with the carriage body 5130, and extends radially across the bore lower end 5164b to provide the central bore 5164 (and the carriage body 5130) with a generally closed bottom 5165. The bore endwall 5168 has an endwall thickness 5318 between the central bore 5164 and the bottom surface 5304 of the lower portion 5130b of the carriage body 5130. The endwall thickness 5318 is generally equal to a sidewall thickness 5320 between the outer surface 5189 of the carriage lower portion 5130b and the inner surface of the central bore 5164.

The actuator connection portion 5148 may be securely coupled to a link member 5150a of the actuator 5150, with suitable bearings 5308 (such as tapered roller bearings) mounted between upper and lower retainers 5309a, 5309b.

With this configuration, the carriage body 5130 can be removed from the machine by releasing the actuator connection portion 5148 from the carriage body 5130, and releasing the upper portion 5130a of the carriage body 5130 from the bearing shoes 5208. A different carriage body can then be installed (for example, a non-rotating stack mold carriage).

Figure 20:
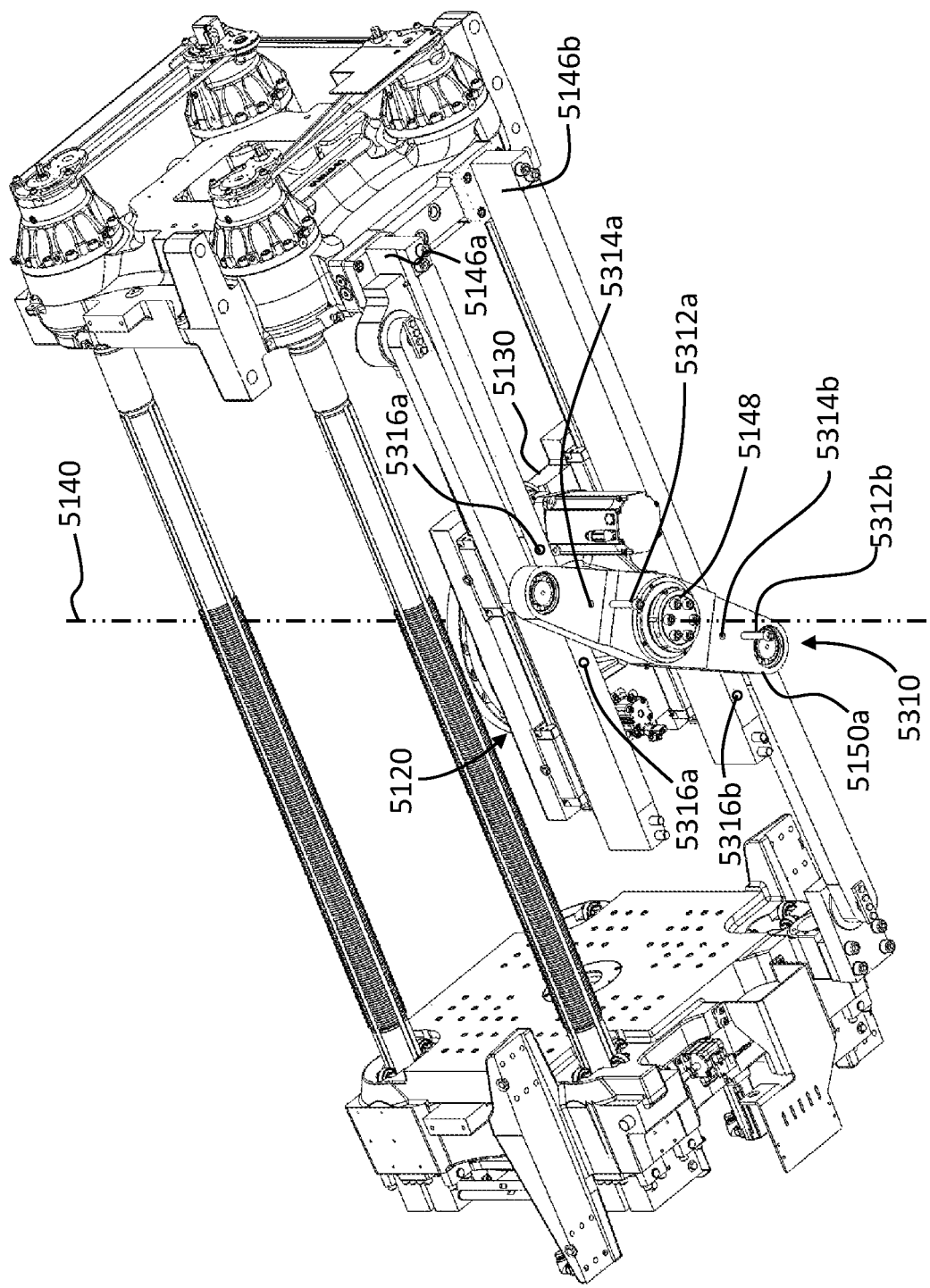
FIG. 20 is a bottom perspective view of portions of the machine of FIG. 19.

With reference to FIG. 20, the rotary apparatus 5120 is further provided with an optional actuator support structure 5310 for supporting the weight of the actuator 5150 when the actuator connection portion 5148 is disconnected from the carriage body 5130. In the example illustrated, the actuator support structure 5150 comprises a first bolt 5312a that can be passed through a first aperture 5314a in the link member 5150a, and fastened in a first threaded hole 5316a provided in the underside of the first carriage beam 5146a. A second bolt 5312b can be provided through a second aperture 5314b in the link member 5150a spaced on the opposite side of the table axis 5140 to engage a second threaded hole 5316b in the second carriage beam 5146b. In the example illustrated, a plurality of first and second threaded holes 5316a, 5316b are provided in the carriage beams 5146a, 5146b to facilitate alignment with the first and second apertures 5314a, 5314b in the link member 5150a.

Prior to releasing the actuator connection portion 5148, the carriage body 5130 can be translated to align the first aperture 5314a with a respective first threaded hole 5316a and the second aperture 5314b with a respective second threaded hole 5316b. The first and second bolts 5312a, 5312b can be installed, so that the link member 5150a is attached to the beams 5146a, 5146b via the first and second bolts 5312a, 5312b. The actuator connection portion 5148 can then be released, with the weight of the actuator 5150 being borne by the carriage beams 5146a, 5146b via the bolts 5312a, 5312b.

Figure 21:
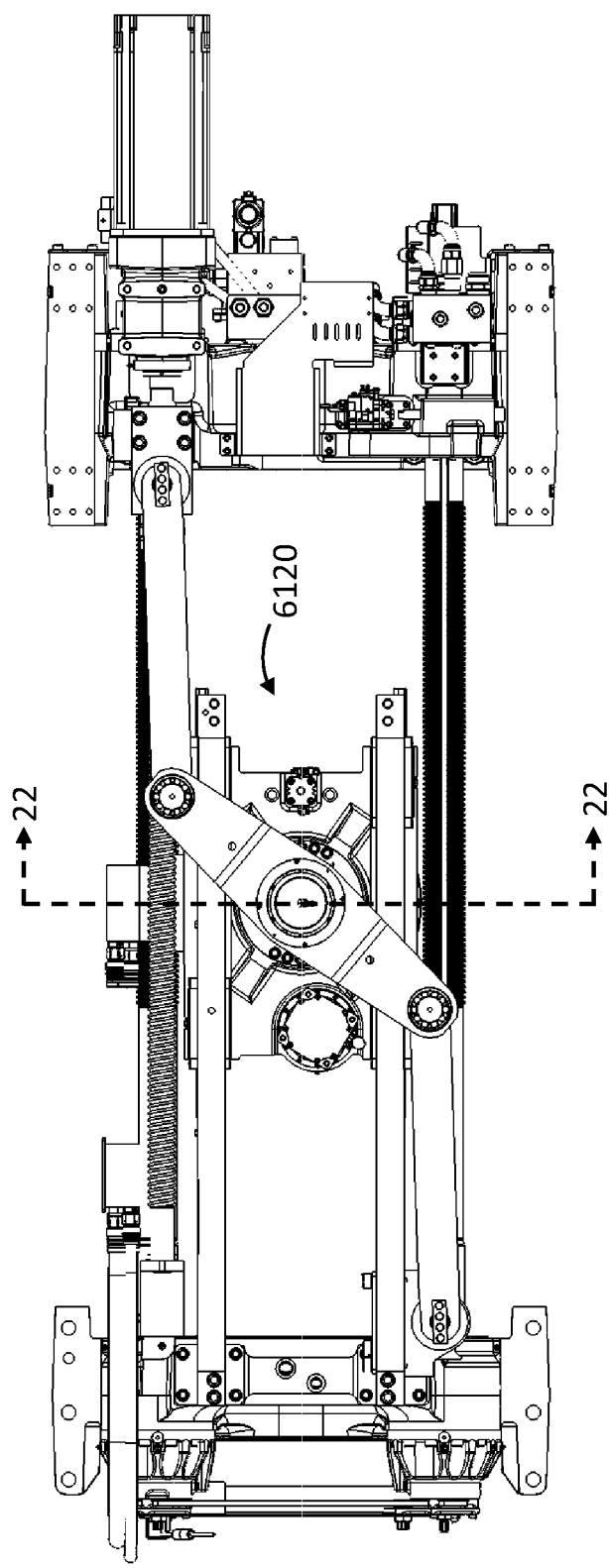
FIG. 21 is a bottom view of portions of another injection molding machine like that of FIG. 1.
Figure 22:
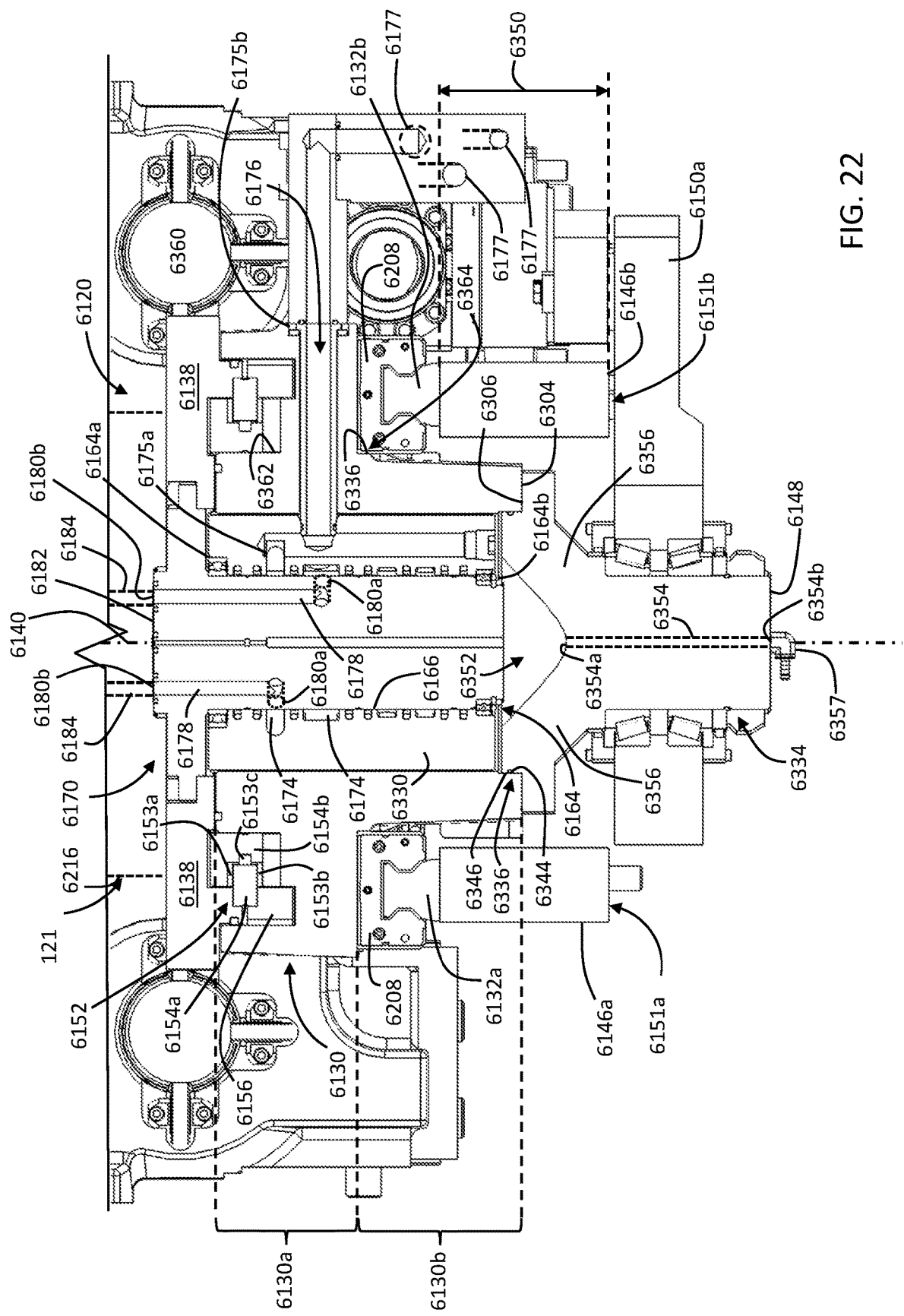
FIG. 22 is a cross-sectional view of portions of the machine of FIG. 21 taken along line 22-22 of FIG. 21.

Referring to FIGS. 21 and 22, another example of a rotary apparatus 6120 is illustrated. The rotary apparatus 6120 is similar to the rotary apparatus 120, and like features are identified by like reference characters, incremented by 6000.

In the example illustrated, the rotary apparatus 6120 includes a carriage body 6130 having a carriage upper portion 6130a and a carriage lower portion 6130b extending downward from the carriage upper portion 6130a. The carriage lower portion 6130b is, in the example illustrated, of integral unitary construction with the carriage upper portion 6130a, and extends downward laterally intermediate first and second carriage rails 6132a, 6132b upon which the carriage body 6130 is slidably supported.

In the example illustrated, the carriage body 6130 includes a central bore 6164 having a central bore upper end 6164a proximate a table 6138 of the apparatus 6120, and a central bore lower end 6164b adjacent a lowermost extent of the carriage lower portion 6130b.

In the example illustrated, the central bore 6164 includes a central bore inner sidewall 6166 extending between the bore upper and lower ends 6164a, 6164b. In the example illustrated, the inner sidewall 6166 has a plurality of annular grooves 6174. Each groove 6174 is in fluid communication with an inner end 6175a of a respective carriage body conduit 6176. Each carriage body conduit 6176 has an outer end 6175b open to an outer surface of the carriage body 6130 for connection to a fluid supply conduit. The term fluid supply conduit includes flow in either direction associated with delivery or return, e.g. higher pressure fluid from a source or lower pressure fluid being returned to tank.

In the example illustrated, a rotary union 6170 is housed in the carriage body 6130 beneath the rotary table 6138. In the example illustrated, the rotary union 6170 is received in the central bore 6164. The rotary union 6170 is fixed to rotate with the table 6138 about the table axis 6140.

In the example illustrated, the rotary union 6170 includes a generally cylindrical body with a plurality of internal union conduits 6178. Each union conduit 6178 extends between a respective union conduit upper end 6180b and a union conduit lower end 6180a in fluid communication with one of the annular grooves 6174 of the inner sidewall 6166 of the central bore 6164. The rotary union 6170 has an upper surface 6182 with the union conduit upper ends 6180b in sealed engagement with lower ends of block conduits 6184 in an underside surface of a center mold support block 6216 of the center mold assembly 121 (shown schematically in FIG. 22) when mounted on the table 6138.

In the example illustrated, the central bore 6164 includes a sleeve 6330 of corrosion-resistant material fixed in the carriage body 6130. The sleeve 6330 can help isolate components of the rotary apparatus 6120 (such as interior surfaces of the carriage body 6130, for example) from service fluids, and may help reduce corrosion of such components. In the example illustrated, the inner sidewall 6166 of the bore 6164 comprises the sleeve 6330. In the example illustrated, the annular grooves 6170 are provided on an inner surface of the sleeve 6330, and portions of the carriage body conduit 6176 extend through a thickness of the sleeve 6330.

In the example illustrated, at least one liquid service connection port 6177 is fixed to the carriage body 6130 for connection to a liquid service supply conduit. The at least one liquid service connection port 6177 is in fluid communication with the rotary union 6170 for providing a respective liquid service from the liquid service supply conduit to the center mold assembly 121. In the example illustrated, all liquid service required by the center mold assembly 121 is provided via the rotary union 6170. In the example illustrated, the machine 100 is free of connection with liquid supply conduits above the center mold assembly 121. In the example illustrated, the liquid service connection port 6177 is at an elevation generally below an elevation of the table 6138.

In the example illustrated, the rotary apparatus 6120 further includes an actuator connection portion 6148 that is separately attachable and detachable to and from the lower portion 6130b of the carriage body 6130. The actuator connection portion 6148 comprises a coupling portion 6334 coupled to a link member 6150a of an actuator, and a load transfer portion 6336 for engagement with the carriage body 6130 to facilitate transfer of a horizontal force from the actuator connection portion 6148 to the carriage body 6130. In the example illustrated, the load transfer portion 6336 and the coupling portion 6334 are of integral, unitary construction with the actuator connection portion 6148.

The bottom surface 6304 of the carriage lower portion 6130b and the upper surface 6306 of the load transfer portion 6336 of the actuator connection portion 6148 may have complementary stepped surfaces to provide generally vertical abutment surfaces which can facilitate transferring a horizontal force from the actuator connection portion 6148 to the carriage body 6130. In the example illustrated, the load transfer portion 6336 comprises a load transfer surface 6346 for engagement with a complementary engagement surface 6344 fixed to the carriage body lower portion 6130b to facilitate transfer of a horizontal force from the actuator connection portion 6148 to the carriage body 6130. In the example illustrated, the load transfer surface 6346 comprises a stepped portion of the upper surface 6306 of the actuator connection portion 6148, and the engagement surface 6344 comprises a stepped portion of the bottom surface 6304 of the carriage body lower portion 6130b. In the example illustrated, the rotary union 6170 is above the actuator connection portion 6148.

In the example illustrated, the carriage body 6130 is slidably supported on a carriage slide surface comprising first and second carriage rails 6132a, 6132b mounted to respective first and second carriage beams 6146a, 6146b. In the example illustrated, each of the first and second carriage beams 6146a, 6146b has a vertical extent 6350. In the example illustrated, the load transfer portion 6336 of the actuator connection portion 6148 is within the vertical extent 6350 of the first and second carriage beams 6146a, 6146b, and the coupling portion 6334 extends below a lowermost extent 6151a, 6151b of the carriage beams 6146a, 6146b. In the example illustrated, the load transfer surface 6346 of the actuator connection portion 6148 is located vertically generally at a midpoint of the vertical extent 6350. This can help reduce the distance between load transfer surface 6346 and the rails 6132a, 6132b, and can help reduce moment loads exerted on the carriage body 6130.

The central bore lower end 6164b is generally closed off by the actuator connection portion 6148. In the example illustrated, the upper surface 6306 of the actuator connection portion 6148 extends radially across the bore lower end 6164b to provide a generally closed bottom for the central bore 6164. In the example illustrated, the upper surface 6306 of the actuator connection portion 6148 includes a recess 6352 beneath the rotary union 6170 that can act as a leakage reservoir. A drain conduit 6354 (shown schematically in FIG. 22) extends through the actuator connection portion 6148. In the example illustrated, the drain conduit 6354 extends from a drain inlet 6354a disposed in an upper surface of the actuator connection portion 6148 beneath the rotary union 6170, and a drain outlet 6354b open to an exterior surface of the actuator connection portion 6148 and disposed at an elevation below the drain inlet 6354a. In the example illustrated, the conduit 6354 extends from a bottom of the recess 6352 to a fitting 6356 fixed to the actuator connection portion 6148 for draining the leakage reservoir.

In the example illustrated, the load transfer portion 6336 of the actuator connection portion 6148 is generally v-shaped when viewed in cross section, and includes arms 6356 (when viewed in cross section) extending upwardly and outwardly from the coupling portion 6334 to the carriage lower portion 6130*b*.

In the example illustrated, the table 6138 is mounted atop the carriage body 6130. The table 6138 is rotatable relative to the carriage body 6130 about a vertical table axis 6140 for rotatably supporting the center mold assembly 121 (shown schematically in FIG. 22). In the example illustrated, the table 6138 is mounted to the carriage body 6130 by a single table bearing 6152 designed to provide high-precision operation under combined loads. The table bearing 6152 includes a combination of bearing elements 6153*a*, 6153*b*, 6153*c* for bearing axial, rotational, and moment loads. The bearing elements 6153*a*, 6153*b*, 6153*c* are contained between a first race 6154*a* fixed in abutting relation to a bottom surface of the table 6138 and a second race 6154*b* fixed in abutting relation to an opposed upper surface of the carriage upper portion 6130*a*. In the example illustrated, an annular drive gear 6156 is fixed relative to the table 6138, and is engaged by a pinion driven by a motor to control rotation of the table 6138.

The position of the center mold sections 121*a-d* (FIGS. 2 and 5) relative to the stationary and moving mold sections 104*a*, 106*a* (FIG. 2) is determined by the position of the table 6138. The position of the table 6138 is, in the example illustrated, controlled by the table bearing 6152 that connects the table 6138 to the carriage body 6130, and by carriage bearing shoes 6208 that connect the carriage body 6130 to the machine base 102. The carriage body 6130 is provided with upper locating features 6360, for example, an annular shoulder 6362 provided on the upper surface of the carriage upper portion 6130*a*, to accurately locate the position of the table bearing 6152 relative to the carriage body 6130.

In the example illustrated, the carriage body 6130 is further provided with lower locating features 6364, for example, a respective axial shoulder 6366 for abutting each respective bearing shoe 6208, to accurately locate the positon of the bearing shoes 6208 relative to the carriage body 6130 (see also FIG. 23). In the example illustrated, the axial shoulder 6366 faces laterally outwardly on both sides of the carriage lower portion 6130*b*, and extends axially (parallel to the machine axis 104) along the length of the carriage body 6130. Providing the upper locating features 6360 in accurate position relative to the lower locating features 6364 can be facilitated when, as in the example illustrated, the upper and lower locating features 6360, 6364 are machined from the same, single piece of material from which the carriage upper and lower portions 6130*a*, 6130*b* are formed.

Referring to FIG. 23, in the example illustrated, the lower portion 6130*b* of the carriage body 6130 has an outer surface 6189 opposite the inner surface of the central bore 6164. The outer surface 6189 can be provided with features to help increase strength and rigidity of the carriage lower portion 6130*b* and to help transfer actuation forces urging the carriage body 6130 to rapidly translate back and forth between mold-open and mold-closed positions.

In the example illustrated, the outer surface 6189 has an inverted frusto-conical shape, with the outer surface 6189 inclined only slightly off vertical (providing a near-cylindrical shape). In the example illustrated, the lower portion 6130*b* of the carriage body 6130 further includes a plurality of gussets 6200, with each gusset 6200 oriented in a generally vertical plane and having a generally laterally extending gusset top edge 6202 fixed to an underside surface 6144 of the upper portion 6130*a* of the carriage body 6130, and a generally vertically extending gusset inner side edge 6204 fixed to the outer surface 6189 of the lower portion 6130*b* of the carriage body 6130. The gussets 6200 are, in the example illustrated, of integral, unitary construction with the carriage body 6130. The gussets 6200 may help increase the rigidity of the carriage body 6130, which may help reduce maintenance intervals and/or increase mold life in some applications.

In the example illustrated, the gussets 6200 are aligned, when viewed from above, along lines extending generally from the table axis 6140 to load bearing contact points of the carriage body 6130. In the example illustrated, the load bearing contact points include the carriage bearing shoes 6208 (FIG. 22) mounted to the underside of the upper portion 6130*a* of the carriage body 6130. In the example illustrated, the underside of the upper portion 6130*a* of the carriage body 6130 is provided with mounting pads 6210 to which the bearing shoes 6208 are mounted.

The invention claimed is:

1. An injection molding machine, comprising:
   a) a stationary platen and a moving platen mounted on a machine base, the stationary platen supporting a stationary mold portion and the moving platen supporting a moving mold portion, the moving platen translatable toward and away from the stationary platen along a pair of platen rails oriented parallel to a machine axis;
   b) a rotary apparatus for rotatably supporting a center mold section, the rotary apparatus translatable along the machine axis between the stationary and moving platens, the rotary apparatus including:
      i) a carriage body including a carriage upper portion having an underside surface supported by first and second carriage rails extending parallel to the machine axis and spaced laterally inwardly of the platen rails, and the carriage body including a carriage lower portion extending downward from the carriage upper portion and laterally intermediate the first and second carriage rails;
      ii) a rotary table mounted atop the carriage body and rotatable relative to the carriage body about a vertical table axis for rotatably supporting the center mold section, the rotary table mounted to the carriage body by a rotary table bearing having a combination of bearing elements to bear axial, rotational, and moment loads, the bearing elements contained between a first race fixed in abutting relation to a bottom surface of the rotary table and a second race fixed in abutting relation to an opposed upper surface of the carriage upper portion; and
   c) a plurality of tie bars extending between the moving platen and the stationary platen for exerting a clamp force across the respective mold portions, the tie bars free from engagement by the rotary apparatus.

2. The machine of claim 1, wherein the first and second carriage rails are mounted to first and second carriage beams, respectively, the first and second carriage beams extending parallel to the machine axis and spaced laterally apart from each other, and the carriage lower portion extending downward between the carriage beams.

3. The machine of claim 1, wherein the first and second carriage rails are spaced laterally apart from each other by a carriage rail spacing, and wherein the table has a table lateral extent when the machine is in a mold-closed condition, the table lateral extent greater than the carriage rail spacing.

4. The machine of claim 1, wherein the carriage rails are generally tangential to the rotary table bearing when viewed along the table axis.

5. The machine of claim 1, wherein the carriage upper portion and the carriage lower portion are of integral, unitary construction with the carriage body.

6. The machine of claim 1, wherein the carriage lower portion has an outer surface generally of inverted frusto-conical shape.

7. The machine of claim 1, wherein the carriage body further includes an actuator connection portion extending downward from the carriage lower portion for attachment to an actuator for urging translation of the rotary apparatus, the actuator connection portion comprising a load transfer portion for engagement with the carriage lower portion and a coupling portion extending downward from the load transfer portion for coupling with the actuator, the load transfer portion for transferring a horizontal force from the coupling portion to the carriage body.

8. The machine of claim 7, wherein the carriage body further comprises a central bore for receiving a rotary union, the central bore having a bore upper end proximate the rotary table and a bore lower end adjacent a lowermost extent of the carriage lower portion, the actuator connection portion extending radially across the bore lower end.

9. The machine of claim 7, wherein the load transfer portion of the actuator connection portion is generally v-shaped in cross-section, comprising arms extending upwardly and outwardly from the coupling portion to the carriage lower portion.

10. The machine of claim 7, wherein the coupling portion comprises a cylindrical boss coaxial with the table axis for pivotable connection to the actuator.

11. The machine of claim 1, wherein the carriage lower portion further includes a plurality of gussets each oriented in a generally vertical plane and having a laterally extending upper edge fixed to the underside surface of the carriage upper portion and a vertically extending inner side edge fixed to the outer surface of the carriage lower portion.

12. The machine of claim 11, wherein the gussets are aligned, when viewed from above, along lines extending generally from the table axis to load bearing contact points of the carriage body when mounted to the base.

13. An injection molding machine, comprising:
a) a machine base;
b) a stationary platen mounted to the machine base for supporting a stationary mold portion;
c) a moving platen for supporting a moving mold portion and translatable along a first platen rail and a second platen rail, the first and second platen rails parallel to each other and to a machine axis; and
d) a rotary apparatus for rotatably supporting a center mold assembly, the rotary apparatus translatable along the machine axis between the stationary and moving platens, the rotary apparatus including:
i) a carriage body including a carriage upper portion having an underside surface supported by first and second carriage rails mounted to respective carriage beams and oriented parallel to the machine axis and spaced laterally apart from each other by a carriage rail spacing; a carriage lower portion extending downward from the carriage upper portion and laterally intermediate the first and second carriage rails; and an actuator connection portion extending downward from the carriage lower portion for attachment to an actuator for urging translation of the rotary apparatus, the actuator connection portion comprising a load transfer portion for engagement with the carriage lower portion and a coupling portion extending downward from the load transfer portion;
ii) a rotary table mounted atop the carriage body and rotatable relative to the carriage body about a vertical table axis for rotatably supporting the center mold assembly; and
iii) a rotary union housed in the carriage body beneath the rotary table and above the actuator connection portion, the rotary union fixed to rotate with the table about the table axis.

14. The machine of claim 13, further comprising a drain conduit extending through the actuator connection portion, the drain conduit extending from a drain inlet disposed in an upper surface of the actuator connection portion beneath the rotary union, and a drain outlet open to an exterior surface of the actuator connection portion and disposed at an elevation below the drain inlet.

15. The machine of claim 13, wherein the rotary union has an upper surface with union conduit upper ends in sealed engagement with lower ends of block conduits in an underside surface of a center mold support block of the center mold assembly when mounted on the table.

16. The machine of claim 15, wherein the carriage body further comprises a central bore for receiving the rotary union, the central bore having a central bore upper end open to a top surface of the carriage upper portion and a central bore lower end opposite the central bore upper end, and wherein the central bore comprises an inner sidewall with a plurality of annular grooves, each groove in fluid communication with an inner end of a respective carriage body conduit, each carriage body conduit having an outer end open to an outer surface of the carriage for connection to a fluid supply conduit.

17. The machine of claim 16, wherein the rotary union comprises a generally cylindrical body with a plurality of internal union conduits, each union conduit extending between a respective one of the union conduit upper ends and a union conduit lower end in fluid communication with one of the annular grooves of the inner sidewall of the central bore.

18. The machine of claim 17, wherein the central bore comprises a sleeve of corrosion-resistant material fixed in the carriage body, wherein the inner sidewall comprises the sleeve.

19. The machine of claim 13, further comprising at least one liquid service connection port fixed to the carriage body for connection to a liquid service supply conduit, the at least one liquid service connection port in fluid communication with the rotary union for providing a respective liquid service from the liquid service supply conduit to the center mold assembly.

20. The machine of claim 19, wherein all of the liquid service required by the center mold assembly is provided via the rotary union.

21. The machine of claim 19, wherein the liquid service connection port is at an elevation generally below an elevation of the table, and wherein the machine is free of connection with liquid supply conduits above the center mold assembly.

22. The injection molding machine of claim 13, further comprising a services distribution assembly disposed above the center mold assembly for providing electrical service to the center mold assembly from at least one upstream electrical supply conductor that is generally stationary relative to the machine base.

23. The machine of claim 22, wherein the services distribution assembly includes a manifold fixed to an upper surface of the center mold support block and in fluid communication with the rotary union, and at least one valve fixed to the manifold for controlling flow through the manifold.

24. The machine of claim 23, wherein the services distribution assembly further comprises a rotary electrical connector having an electrical rotor member fixed to rotate with the center mold support block and an electrical stator member adjacent the rotor member and fixed to an anti-rotate stay, the stator member translatable with the carriage body and free of attachment to the tie bars, the rotor member rotatably coupled to the stator member, and the electrical connector providing electrical communication between the upstream electrical supply conductor and a downstream conductor connected to the valve.

25. The machine of claim 24, wherein the anti-rotate stay comprises an overhanging end of a support arm, the support arm slidably mounted to the stationary platen.

26. The machine of claim 25, further comprising a mounting plate secured to the stationary platen and a horizontal rail fixed to the mounting plate, the support arm slidably coupled to the horizontal rail.

27. The machine of claim 24, wherein the anti-rotate stay comprises an upper shaft coaxial with the table axis and disposed vertically above the upper end of the block, the upper shaft maintaining a generally fixed rotational position relative to the carriage body.

28. The machine of claim 27, wherein the upper shaft comprises a motor driveshaft coupled to a motor, wherein rotation of the driveshaft is controllable by the motor to be generally equal in velocity and extent but opposite in direction in relation to rotation of the rotary table.

29. The machine of claim 27, wherein the upper shaft comprises an upper portion of a central rod that extends vertically through the block, the rod having a rod lower end fixed to the carriage body and the block rotatable about the rod.

30. The machine of claim 29, further comprising a horizontally oriented lock screw in engagement with a flat provided on rod lower end.

\* \* \* \* \*